United States Patent [19]
Moss et al.

[11] Patent Number: 5,738,306
[45] Date of Patent: Apr. 14, 1998

[54] ARTICULATING PATIENT LOADING SYSTEM AND TRANSPORT DEVICE FOR AIRCRAFT

[75] Inventors: Jeff M. Moss, Golden; Roger R. B. Thibault, Colorado Springs, both of Colo.

[73] Assignee: Air Methods Corporation, Englewood, Colo.

[21] Appl. No.: 643,399

[22] Filed: May 6, 1996

Related U.S. Application Data

[63] Continuation-in-part of Ser. No. 542,598, Oct. 13, 1995.

[51] Int. Cl.$^6$ ............................ B64D 9/00; A61G 1/06
[52] U.S. Cl. ........................ 244/137.2; 244/118.6; 296/20; 5/81.1
[58] Field of Search ...................... 244/118.1, 118.6, 244/118.5, 137.1, 137.2; 296/19, 20; 5/81 HS, 81 RP, 81.1

[56] References Cited

U.S. PATENT DOCUMENTS

| | | |
|---|---|---|
| 771,039 | 9/1904 | Boecker . |
| 943,827 | 12/1909 | Hennessy . |
| 2,201,890 | 5/1940 | Dunn .................................... 5/82 |
| 2,512,160 | 6/1950 | Koenigkramer et al. ............ 296/20 |
| 3,151,343 | 10/1964 | McCormick ........................ 5/82 |
| 3,566,422 | 3/1971 | Klippel .............................. 5/82 |
| 3,605,136 | 9/1971 | Vichness et al. .................... 5/8 |
| 3,648,305 | 3/1972 | Ersek ................................. 5/82 |
| 3,831,996 | 8/1974 | Layer ............................... 296/19 |
| 3,840,265 | 10/1974 | Stirling et al. ..................... 296/19 |
| 3,886,606 | 6/1975 | Bradford ........................... 5/82 |
| 3,947,686 | 3/1976 | Cooper et al. ..................... 250/439 |
| 4,115,884 | 9/1978 | Keogh .............................. 244/118.6 |
| 4,178,032 | 12/1979 | Hone ................................ 296/19 |
| 4,252,594 | 2/1981 | Cooper ............................. 156/285 |
| 4,378,128 | 3/1983 | Holling et al. .................... 296/19 |
| 4,566,445 | 1/1986 | Jelsma et al. ..................... 128/70 |
| 4,783,025 | 11/1988 | Moffett ............................ 244/118.5 |
| 5,054,049 | 10/1991 | Manabe ............................ 378/208 |
| 5,135,350 | 8/1992 | Eelman et al. ................... 296/20 |
| 5,274,864 | 1/1994 | Morgan ............................ 5/627 |
| 5,372,339 | 12/1994 | Morgan .......................... 244/118.5 |
| 5,490,703 | 2/1996 | Hewko ............................ 244/137.2 |
| 5,595,470 | 1/1997 | Berkey et al. ................... 244/137.2 |

FOREIGN PATENT DOCUMENTS

| | | |
|---|---|---|
| 1491267 | 10/1969 | Germany . |
| 1435223 | 5/1976 | Germany . |
| 1715 | 1/1900 | United Kingdom . |
| 754052 | 8/1956 | United Kingdom . |

OTHER PUBLICATIONS

Brochure, Heli–Dyne Systems, Inc., no date.

*Primary Examiner*—Virna Lissi Mojica
*Attorney, Agent, or Firm*—Holme Roberts & Owen

[57] ABSTRACT

A selectively tiltable patient loading system and transport device adapted for use in aircraft is disclosed. The device generally comprises a base assembly interconnected to the floor of an aircraft, a platform assembly capable of receiving and supporting a litter with a patient thereon, and an interconnecting assembly interposed between the base assembly and platform assembly for supportably interconnecting the platform assembly to the base assembly and for selectively tilting the platform assembly relative to the base assembly.

21 Claims, 37 Drawing Sheets

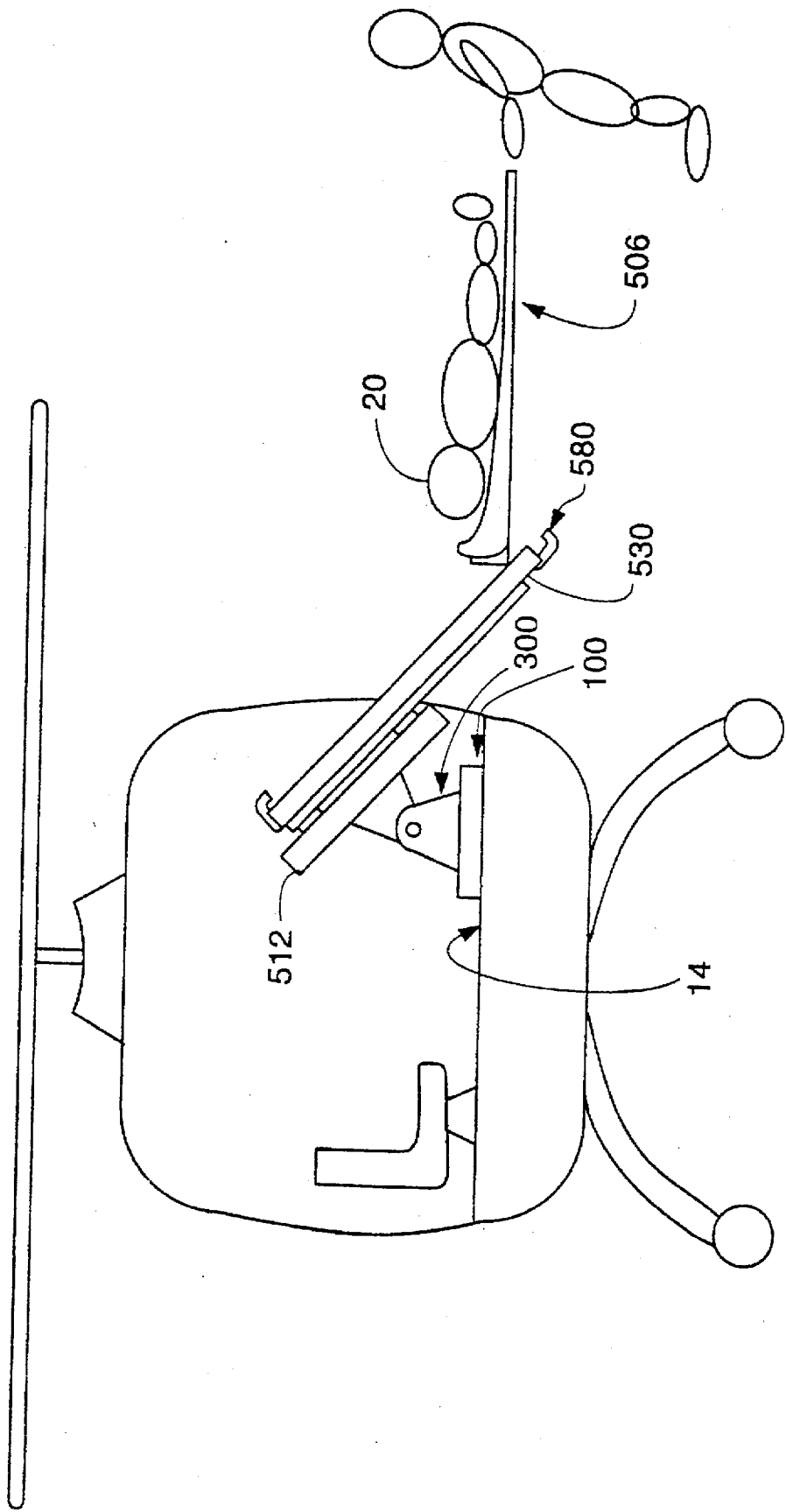

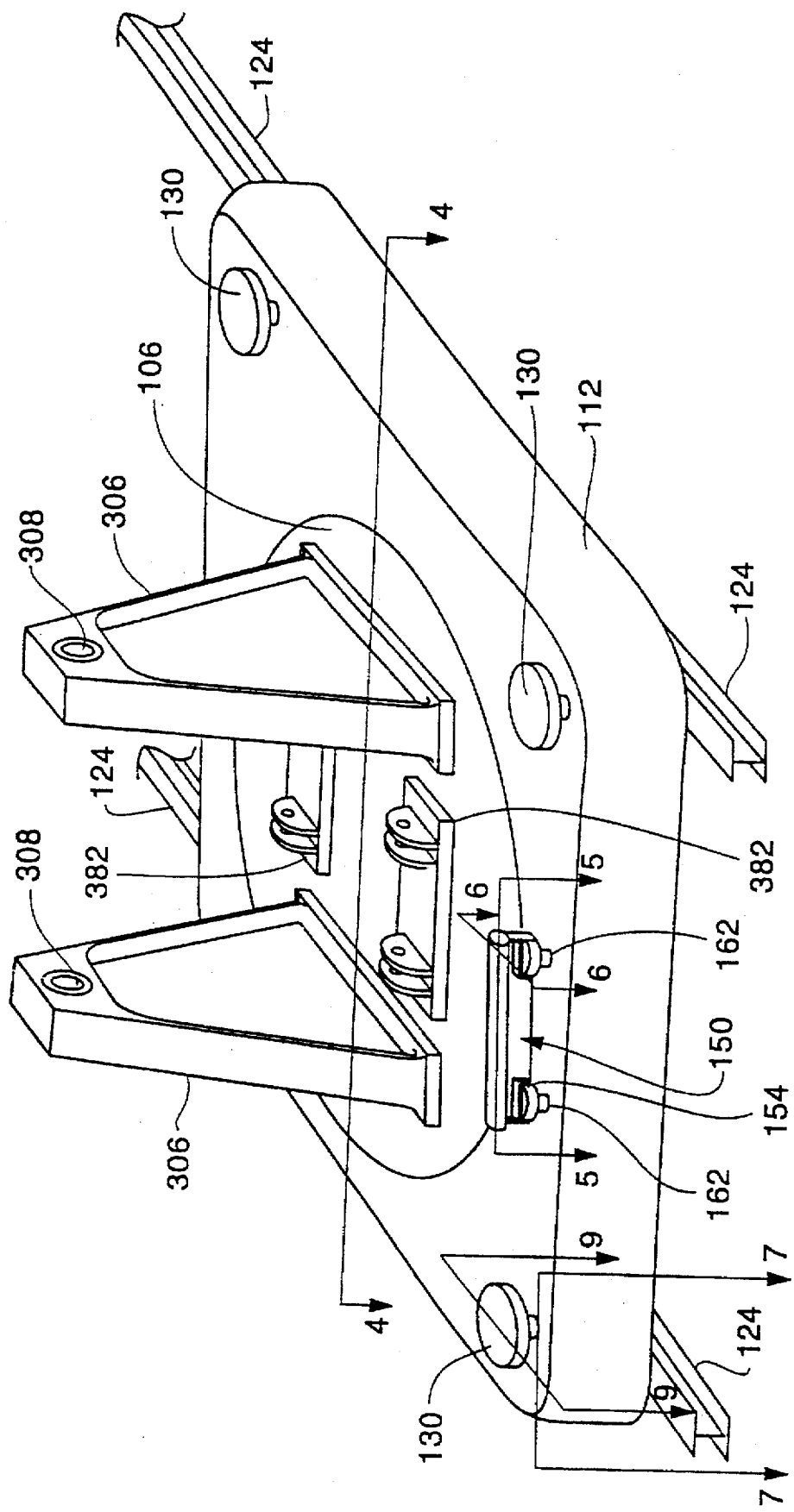

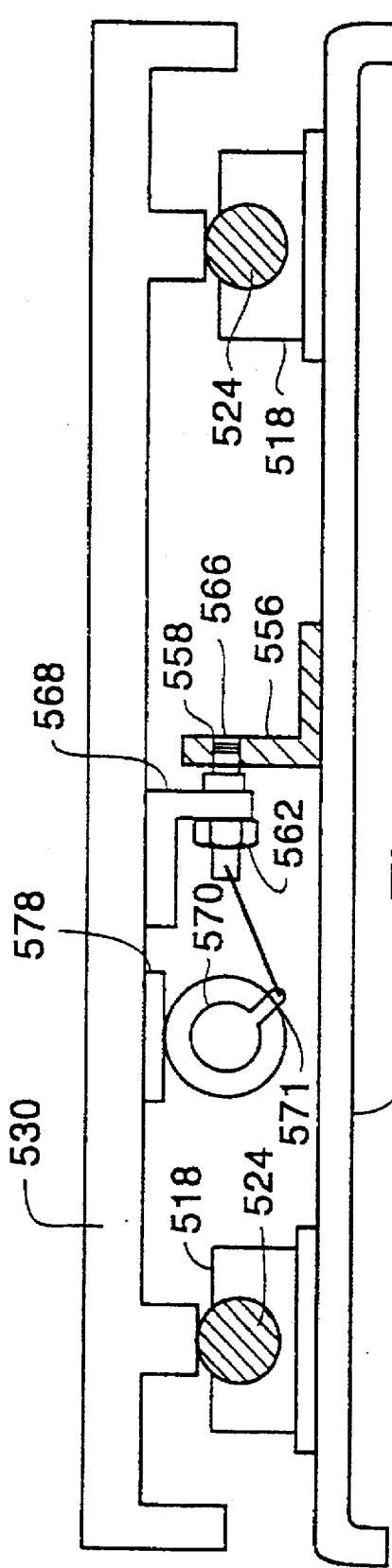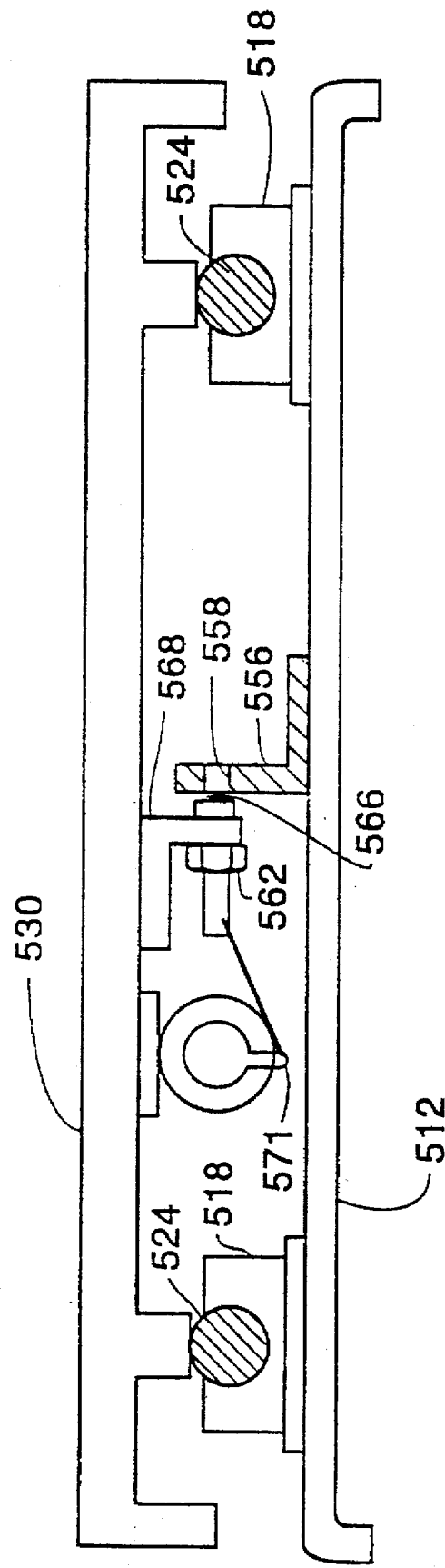

5,738,306

ARTICULATING PATIENT LOADING SYSTEM AND TRANSPORT DEVICE FOR AIRCRAFT

RELATED APPLICATIONS

This application is a continuation in part of co-pending U.S. application Ser. No. 08/542,598, filed on Oct. 13, 1995, the entire disclosure of which is incorporated by reference herein.

FIELD OF THE INVENTION

This invention generally relates to a litter support system for medical patients and, more particularly, to an selectively tiltable patient loading system and transport device adapted for use in aircraft.

BACKGROUND OF THE INVENTION

In instances where a patient must be transported, and especially in emergency medical care situations, patients must typically be loaded into an emergency medical vehicle, transported from the emergency site (e.g., accident scene) to a medical facility (e.g., hospital or acute care facility), medically treated in route to the medical facility and unloaded from the emergency medical vehicle for further medical treatment at the medical facility. As speed is of the essence in such situations, the loading, transporting, treating and unloading of the patient during this period should be conducted efficiently and effectively, and otherwise accommodate patient positioning for medical treatment. It can be appreciated that this is especially true in instances where the emergency or pick-up site is in a remote area. In this regard, the patient loading system and transport device should also be reliable and easy to operate.

SUMMARY OF THE INVENTION

Accordingly, an object of the present invention is to provide an easily and readily utilized device for loading, transporting, treating and unloading patients into and out of an emergency vehicle, such as an aircraft.

It is another object of the present invention to provide a device capable of assuming different positions during loading, unloading and/or transport of the patient.

It is another object of the present invention to provide a device capable of enhancing emergency medical treatment.

To achieve one or more of these objectives the present invention includes a base assembly interconnected to the floor of an aircraft, a platform assembly capable of receiving and supporting a litter with the patient thereon, and an interconnecting assembly interposed between the base assembly and the platform assembly.

In one aspect of the invention, the base assembly comprises a base support plate and a block platform interconnected to a lower surface of the base support plate, substantially between the base support plate and the floor of the aircraft. In this regard, the block platform provides enhanced support to the base assembly as at least a portion of the loads (e.g., overturning moments, crash loads) may be translated into the floor of the aircraft via the block platform, as the block platform contacts the floor.

In another aspect of the invention, the interconnecting assembly provides for the selective tilting or pitching adjustment of the platform assembly relative to the base assembly. In one embodiment, the interconnecting assembly includes a hinging means interposed between the platform assembly and the base assembly and elevated a distance above the base assembly to allow for pivotal movement (e.g., tilt or pitch) of the platform assembly relative to the base assembly to facilitate medical treatment and loading and unloading of the patient. For example, the platform assembly may be articulated (e.g., tilted) relative to the base assembly to position the patient into an anti-shock (Trendelenburg) position and into a reverse anti-shock (Reverse Trendelenburg) position. In one embodiment, the hinging means interconnects at least one upper bracket attached to the platform assembly and at least one lower bracket attached to the base assembly, the hinging means comprising bushings and rod members positioned within corresponding bores of the upper and lower brackets.

In a further aspect of the invention, the interconnecting assembly includes a supporting means for counterbalancing the litter platform and patient thereon during tilting of the litter platform, and for supporting patient loads. In one embodiment, the supporting means comprises a plurality of retractive and extensive telescoping members which extend between and interconnect the upper bracket and lower bracket of the interconnecting assembly.

In another aspect of the invention, the interconnecting assembly includes a means for selectively tilting the platform assembly relative to the base assembly. In this regard, the tilting means can lock the platform assembly and patient at any one of a plurality of medical treatment tilt positions. Advantageously, the tilting means is hand operable about the platform assembly such that the platform assembly can be tiltably controlled and/or adjusted by the operator's hand(s) as the operator grips or otherwise engages the platform assembly, and more specifically, the litter platform. In the illustrated embodiment, the tilting means includes a handle activated pulley and cable system which controls the selectively retractable locking subassembly. The selectively retractable locking subassembly comprises at least one pin selectively engageable with at least one channel in one of the upper or lower brackets of the interconnecting assembly.

In yet another aspect of the invention, the interconnecting assembly includes means for reacting to and resisting crash loads. In the illustrated embodiment, the selectively retractable locking subassembly and specifically, the engagement of at least one spring plunger pin within a corresponding channel in one of the upper and lower brackets (e.g., swash plates) of the interconnecting assembly enhances the shear strength of the device to thereby resist crash loads. In this regard, the retractable locking subassembly substantially locks the platform assembly at a selected tilt position relative to the base assembly while substantially inhibiting collapse of the platform assembly relative to the base assembly under adverse load conditions (e.g., crash loads).

In an additional aspect of the invention, the platform assembly is connected to the interconnecting assembly and has a litter platform for supporting the patient and litter. In one embodiment, the platform assembly includes a litter slide means to allow for slidable movement of the litter platform relative to the upper bracket of the interconnecting assembly for positioning the litter platform in a convenient loading or unloading location relative to the base assembly. The litter slide means may include at least one track on one of the litter platform and the upper bracket of the interconnecting assembly, at least one roller means on the other of the litter platform and upper bracket and at least one roller bearing for rollably engaging the track. The roller means may include a captive roller type bearing for engaging and guiding the track such that the lower surface of the track rollably engages the roller bearings and the upper surface of the track is rollably engageable with the rollers in the captive roller type bearings.

In another aspect of invention, the platform assembly includes a litter slide locking subassembly for selectively positioning and locking the litter platform at one of a plurality of slide positions. In this regard, the litter slide locking subassembly may lock the litter platform in any one of plurality of locations relative to the upper bracket of the interconnecting assembly to stabilize the platform assembly during flight operations. The litter slide locking subassembly may be hand operable about the platform subassembly such that the litter plate may be slidably controlled by the operator's hand(s) as the operator grips or otherwise engages the platform assembly and, more specifically, the litter platform.

In yet another aspect of the invention, the platform assembly includes a litter engaging means for securing the litter on the litter platform. In one embodiment, the litter engaging means comprises a hand retractable spring plunger which selectively positions and secures a C-shaped member about an end portion of the platform assembly.

As will be appreciated, the present invention allows four independent ranges of motion to facilitate the loading, transport, treatment and unloading of the patient in and from the aircraft. These and other features, advantages and objects of the present invention will be further understood and appreciated by those skilled in the art by reference to the following written specification, claims and appended drawings.

BRIEF DESCRIPTION OF THE DRAWINGS

FIG. 2A is a front view of the device of FIG. 1 with the litter and patient thereon being loaded onto the device and into a helicopter.

FIG. 3A is a perspective view of the base assembly of the device illustrated in FIG. 1.

FIGS. 18A and 18B are rear, cross-sectional views of the litter slide locking subassembly illustrated in FIG. 17, taken along line 18—18.

DETAILED DESCRIPTION

Figure 1:
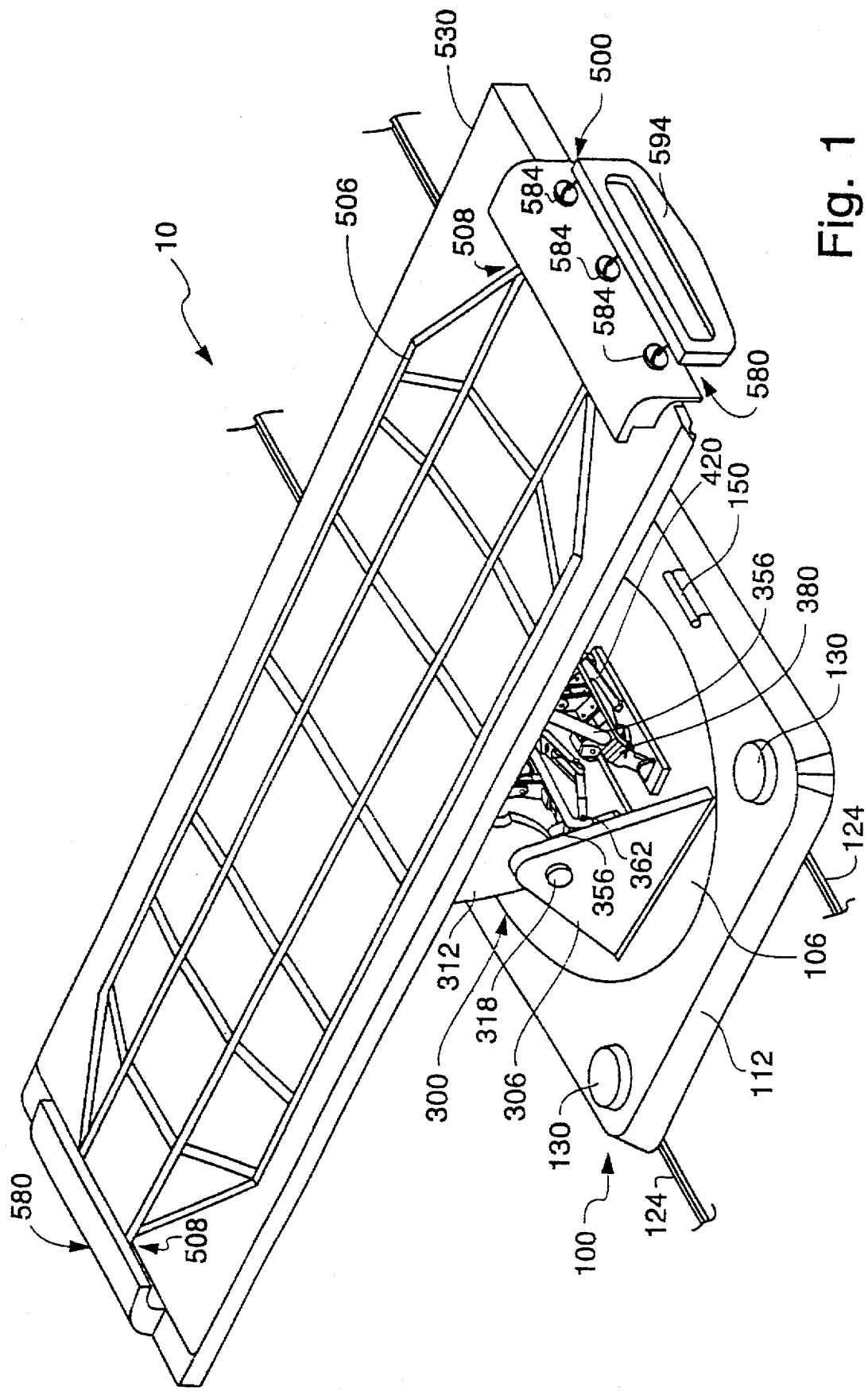
FIG. 1 is a perspective view of the device embodying the present invention.

FIGS. 1-20 illustrate a patient loading system and transport device embodying the features of the present invention. Referring to FIGS. 1 and 2A-2C, the device 10 generally comprises a base assembly 100, an interconnecting assembly 300 and a platform assembly 500 upon which a patient 20 may be positioned. The base assembly 100 is connectable to the floor 14 of a helicopter. The interconnecting assembly 300 extends between and interconnects the base assembly 100 and the platform assembly 500. As will be described generally and then in more detail below, the device 10 may be capable of four independent ranges of motion.

The base assembly 100 primarily functions to support the platform assembly 500 and patient 20 thereon via the interconnecting assembly 300. Furthermore, and as illustrated in FIGS. 1, 3A-3B, 4-9, the base assembly 100 accommodates two independent ranges of motion. In the illustrated embodiment, in which the first range of motion is provided for purposes of facilitating the loading and unloading of the patient 20, the base assembly 100 allows rotational (e.g., turntable) movement of the patient 20 relative to the helicopter while supporting the interconnecting and platform assemblies 300, 500, as well as the patient 20. In this regard, the base assembly 100 includes a circular plate 106 which is rotatably captured within a base support plate 112, which is connected to the floor 14 of the helicopter. For purposes of selectively releasing and locking the circular plate 106 from or at a chosen rotational position, the base assembly 100 may also include a turntable locking subassembly 150, which locks the circular plate 106 in any one of a plurality of selected rotational positions relative to the base support plate 112.

Figure 7:
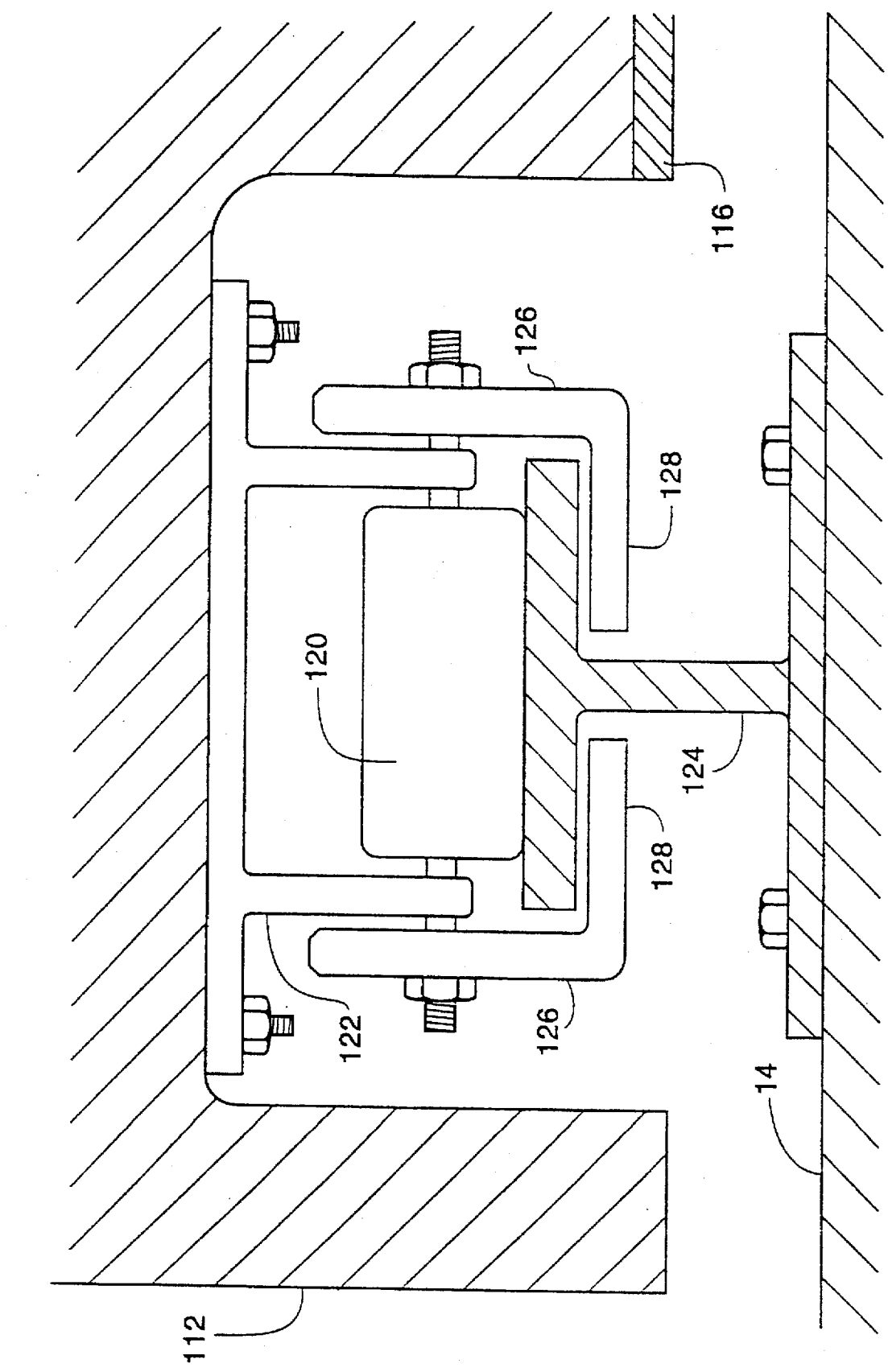
FIG. 7 is a cross-sectional view of the base assembly illustrated in FIG. 3A, taken along line 7—7, mounted on a track via a roller bearing.
Figure 8A:
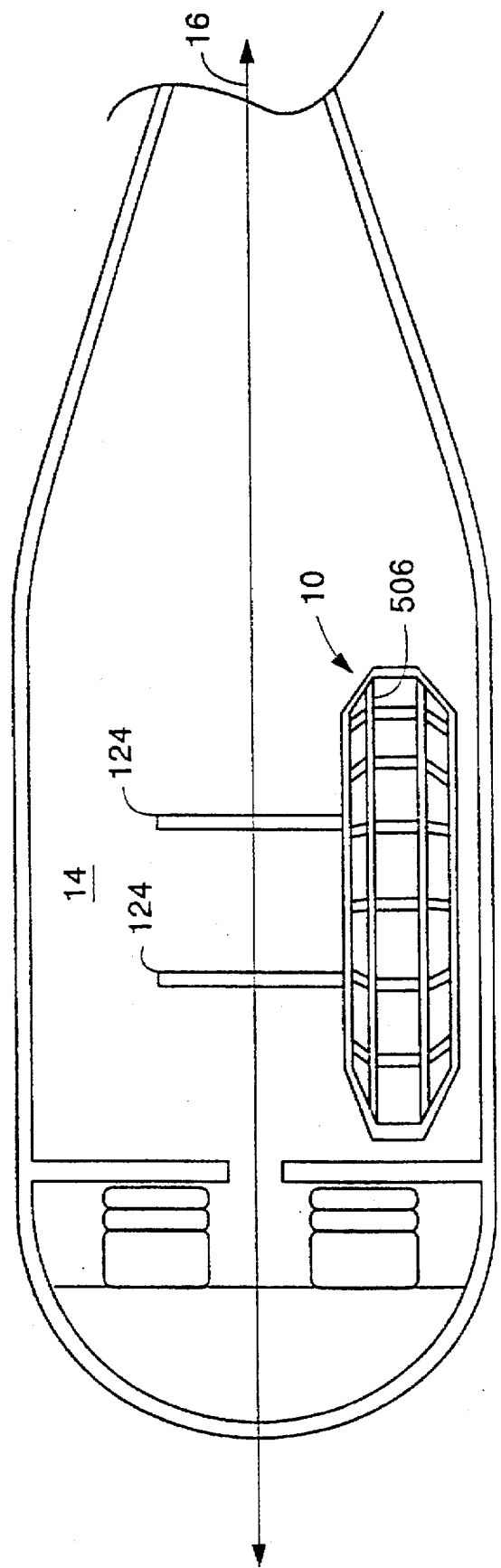
FIG. 8 is a top view of the device illustrated in FIGS. 2 and 3A loaded into a helicopter.
FIG. 8B is a top view of two devices illustrated in FIGS. 2 and 3A loaded into a helicopter.
Figure 8B:
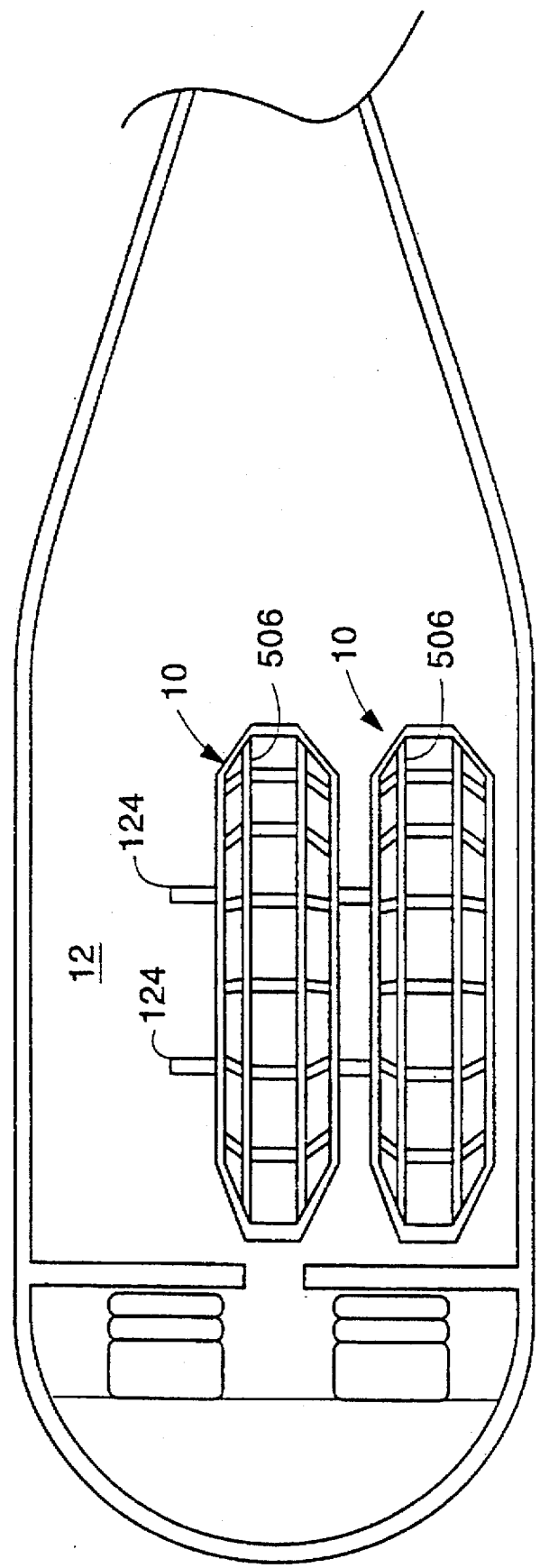
Figure 9A:
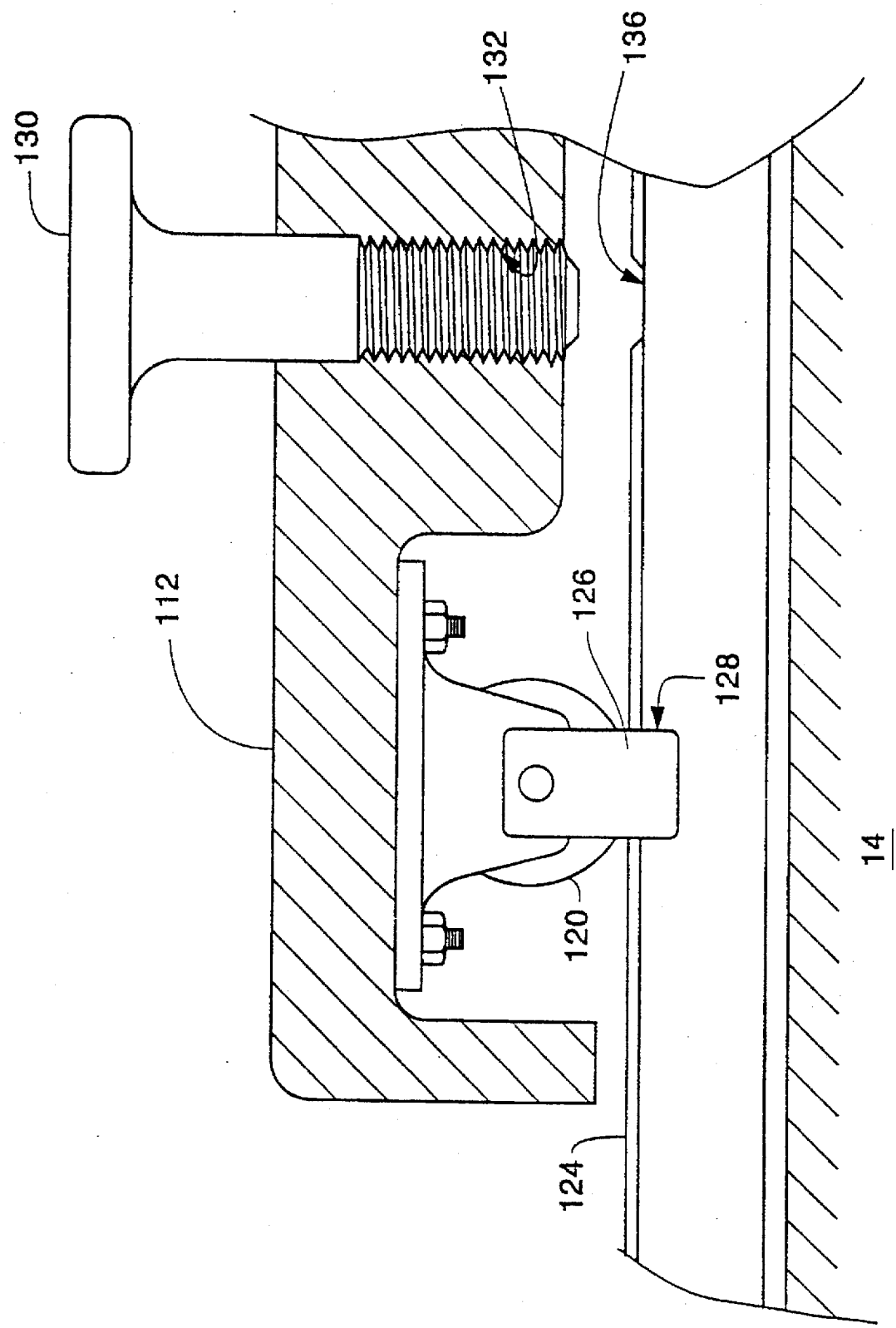
FIGS. 9A and 9B are cross-sectional views of the base assembly illustrated in FIG. 3A, taken along line 9—9, showing the base slide locking subassembly in unlocked and locked positions, respectively.
Figure 9B:
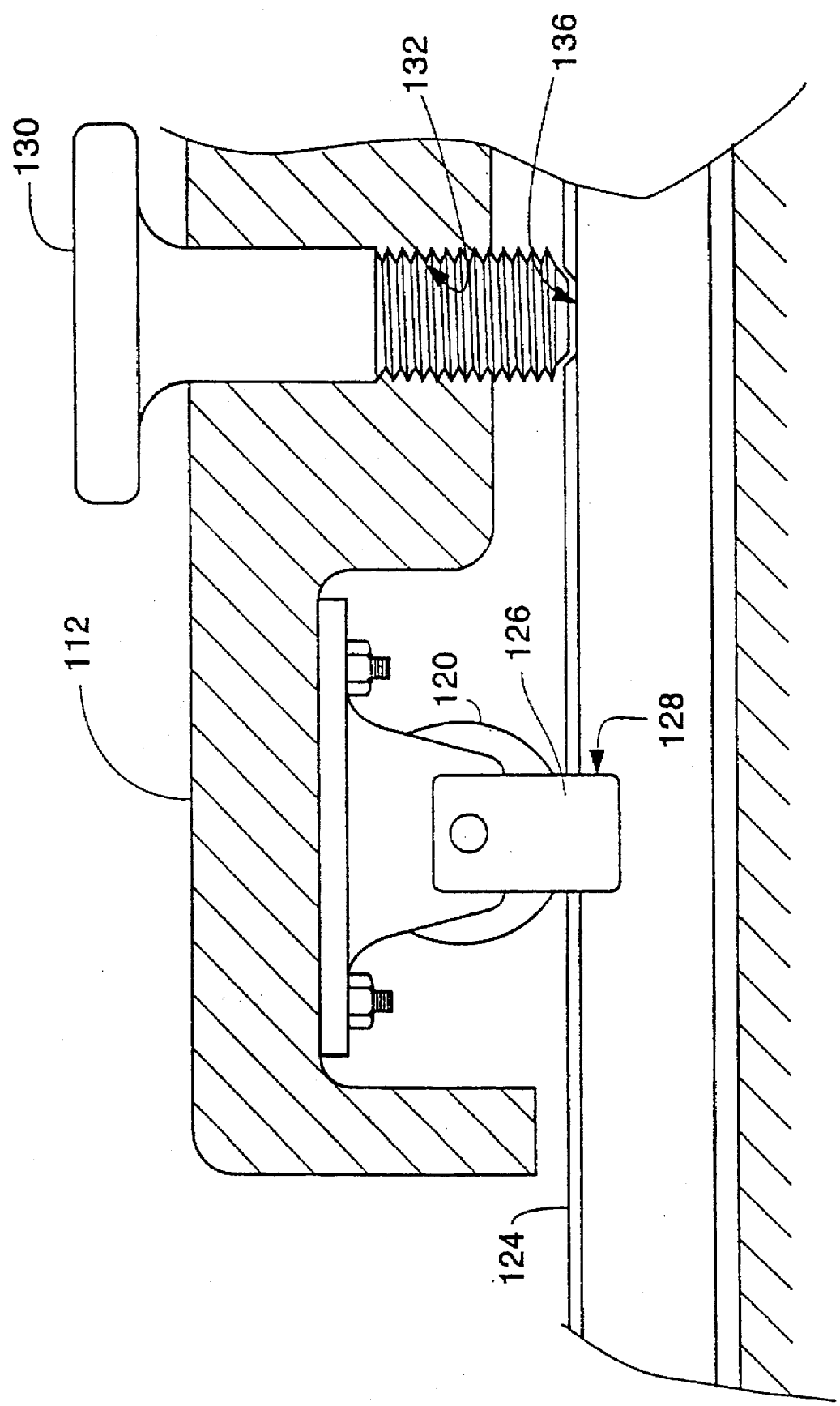
Figure 10:
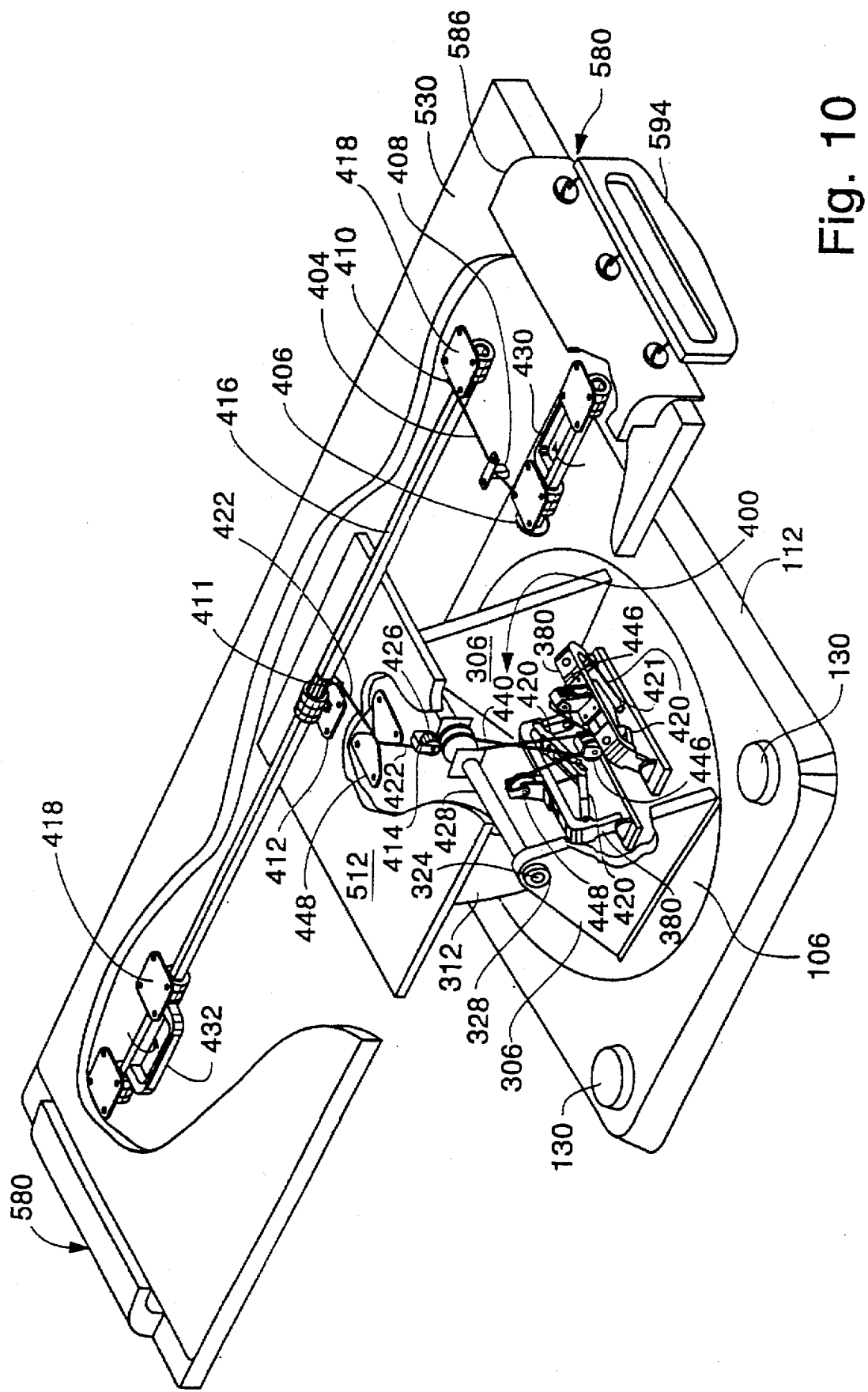
FIG. 10 is a perspective, cut-away view of the device illustrated in FIG. 1 showing the interconnecting assembly without the telescoping members.
Figure 11A:
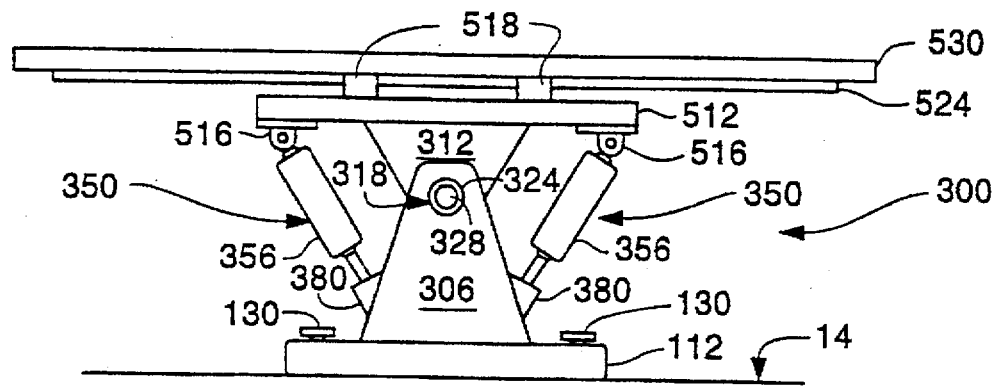
FIGS. 11A, 11B and 11C are side views of the device illustrated in FIG. 1 showing the selected tilt positions of the platform assembly.
Figure 11B:
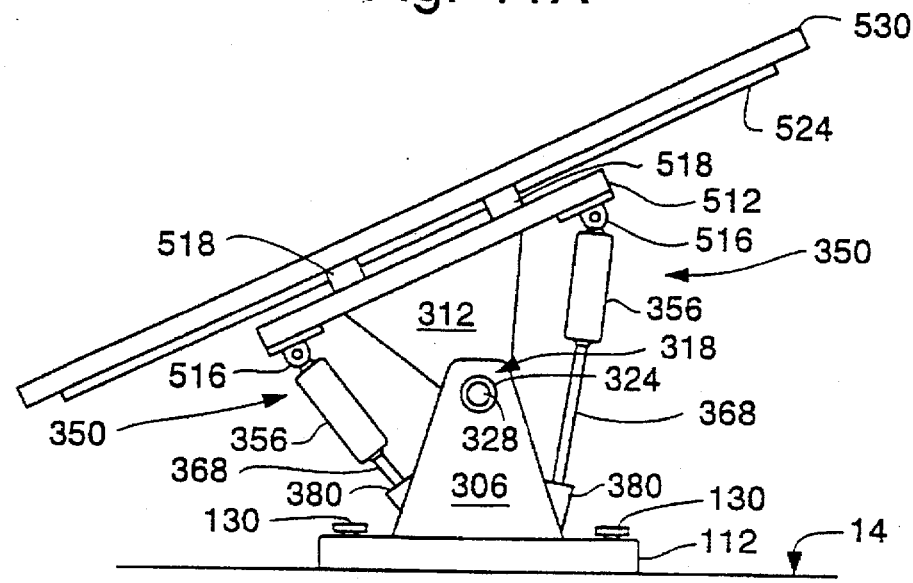
Figure 11C:
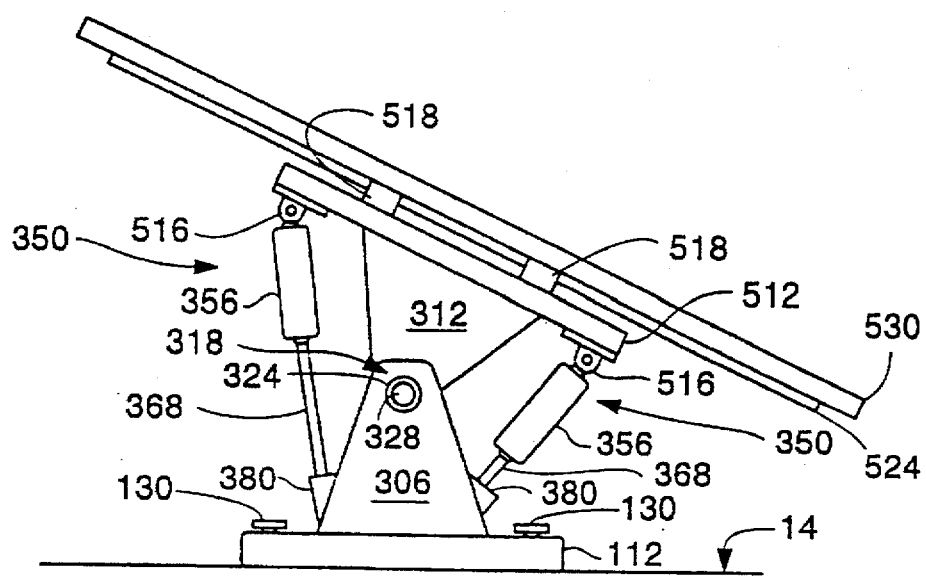
Figure 12:
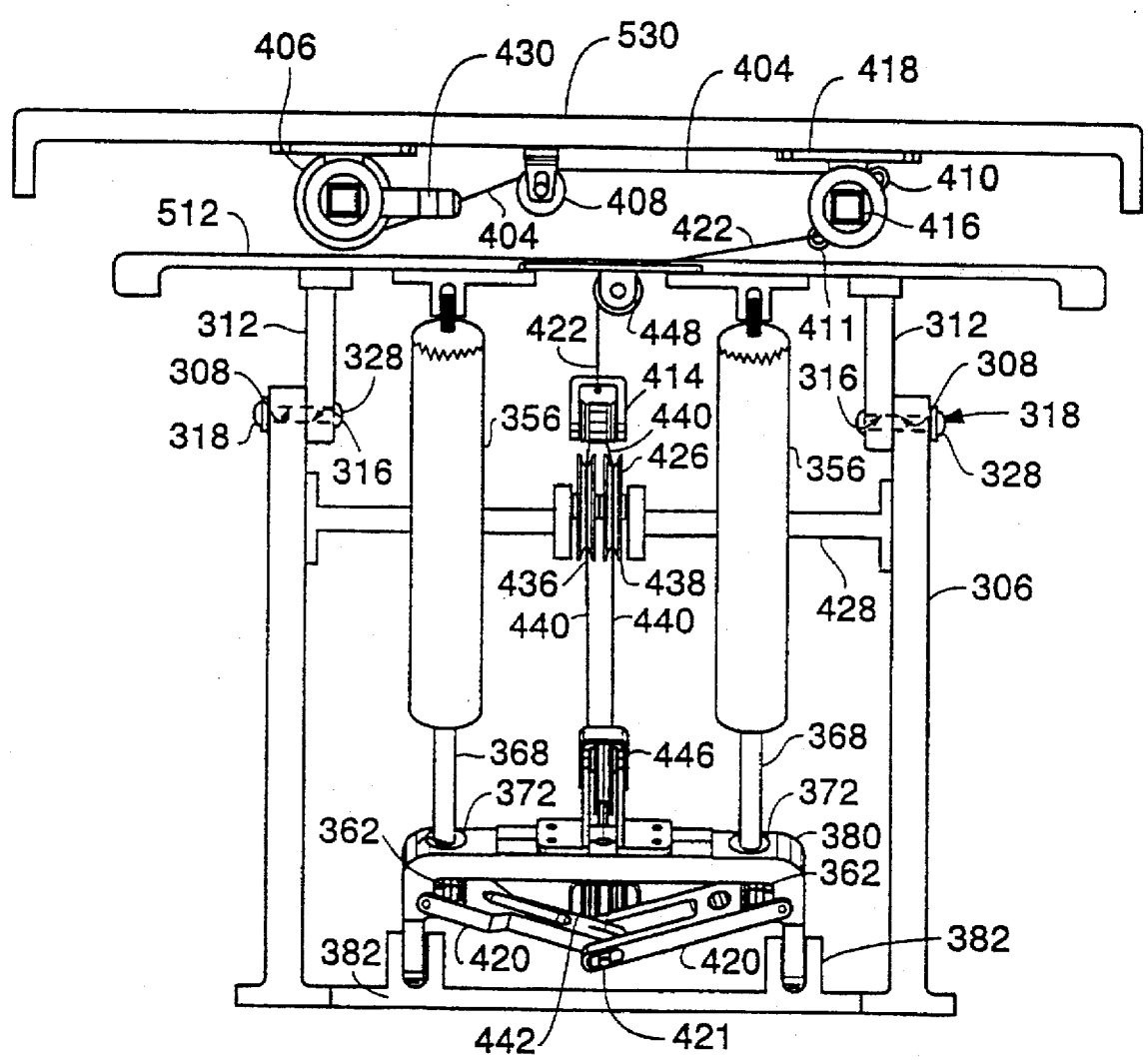
FIG. 12 is a rear view of the various components of the interconnecting assembly illustrated in FIG. 10, with the telescoping members in position and showing only the rear yoke and struts.
Figure 13:
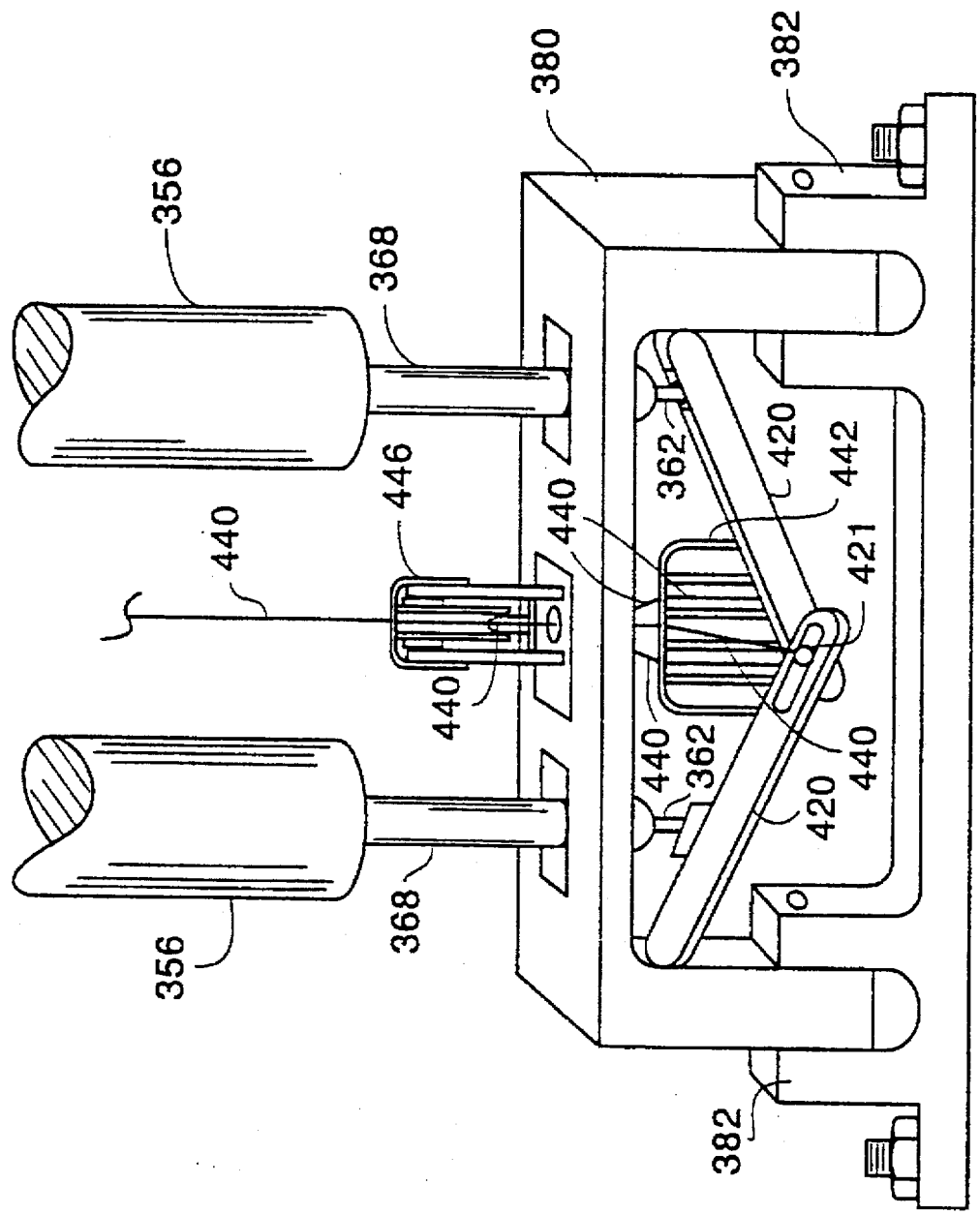
FIG. 13 is a perspective view of the interconnecting assembly showing the struts being actuated by the actuating means.
Figure 14:
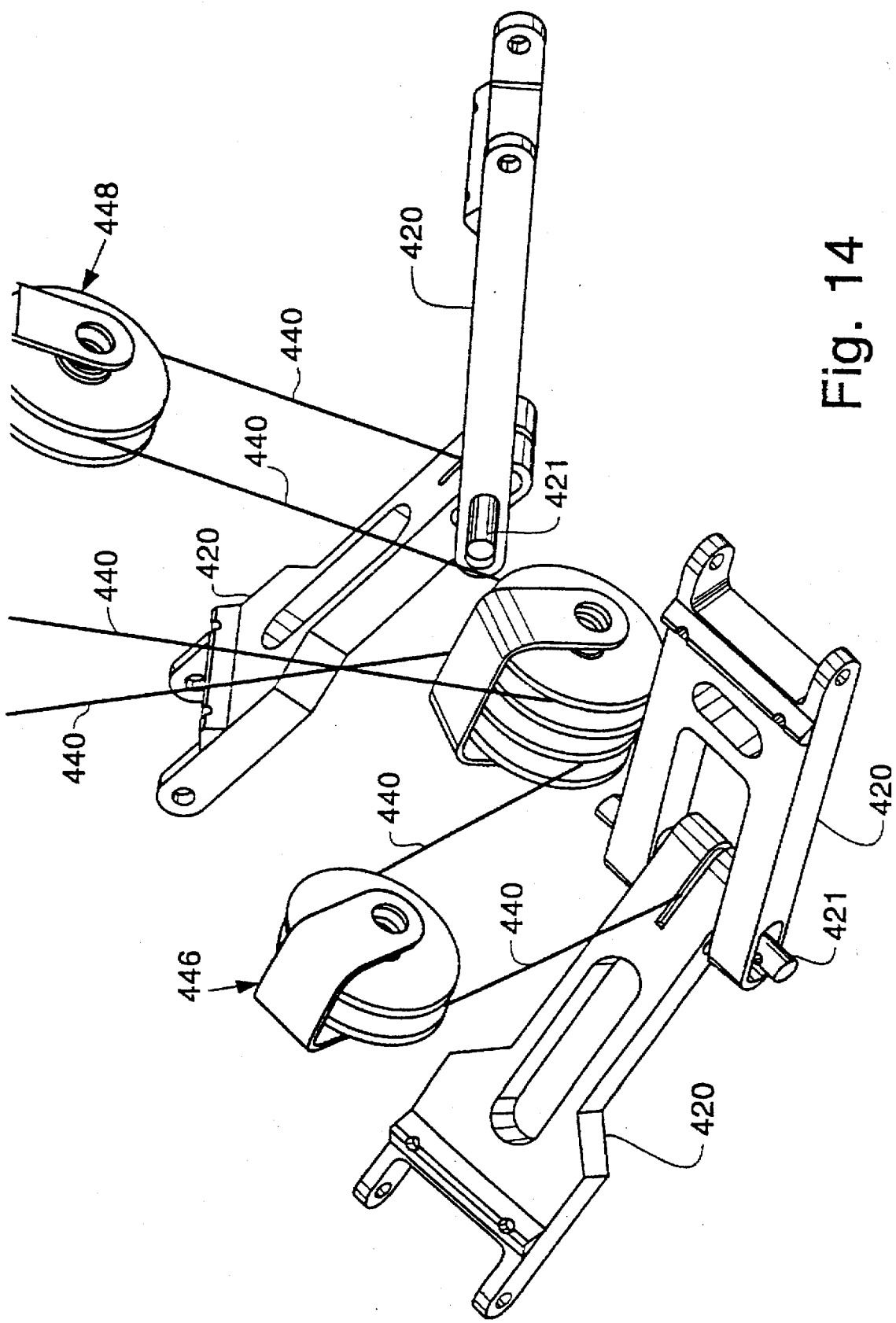
FIG. 14 is a perspective view of the actuating plates and pulleys of the interconnecting assembly.
Figure 15:
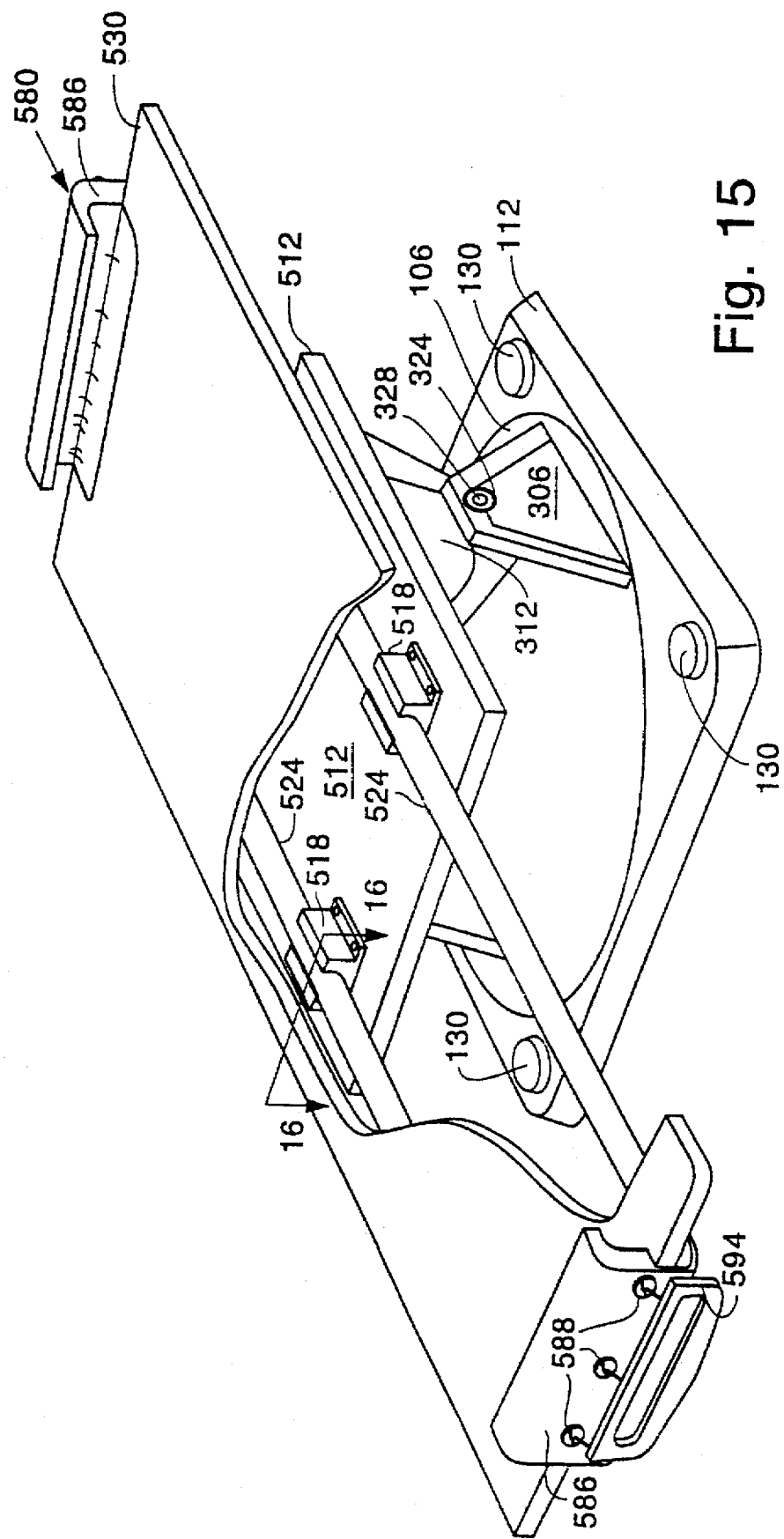
FIG. 15 a perspective, cut-away view of the device illustrated in FIG. 1 showing the litter slide means of the platform assembly.

As shown in FIGS. 7, 8A-8B, the base assembly 100 accommodates a second range of motion. In this embodiment, the base assembly 100 may include a plurality of roller bearings 120 attached to the underside of the base support plate 112 and slidably engageable with least one seat track 124 to allow slidable movement of the base assembly 100, interconnecting assembly 300, platform assembly 500 and patient 20 thereon in a direction transverse to a longitudinal axis 16 of the helicopter and relative to the floor 14. In this regard, a device 10 and patient 20 thereon can be easily moved to facilitate medical treatment of the patient and/or to accommodate loading, transport and/or medical treatment of at least a second patient aboard the helicopter 20.

The interconnecting assembly 300, shown in FIGS. 1, 10-13 primarily functions to support the platform assembly 500 and to translate forces/loads applied on the platform assembly 500 to the base assembly 100. Furthermore, the interconnecting assembly 300 accommodates a third range of motion of the device 10. For purposes of allowing tilting (e.g., pitching) of the patient 20 and platform assembly 500 relative to the base assembly 100 to facilitate medical treatment and loading and unloading of the patient, the interconnecting assembly 300 may include at least one lower bracket 306 interconnected to the base assembly 100, at least one upper bracket 312 interconnected to the platform assembly 500 and a hinging means 318 for hingedly interconnecting the lower and upper brackets 306, 312 for pivotal movement therebetween. In this regard, the platform assembly 500 may be articulated into an anti-shock (Trendelenburg) position and into a reverse anti-shock (Reverse Trendelenburg) position, as will be described in more detail below.

The interconnecting means 300 may also include a supporting means 350 for supporting patient loads and for reacting to crash loads. In this regard, the supporting means 350 functions to transfer loads from the platform assembly 500 to the base assembly 100 since the supporting means 350 extends from and interconnects the platform assembly 500 and the base assembly 100. The supporting means 350 may comprise a plurality of telescoping members, such as center pin actuated struts 356. For purposes of facilitating tilting of the platform assembly 500 and the patient 20 thereon relative to the base assembly 100, the interconnecting assembly 300 may also include an actuating means 400 for controlling the lengths of the struts 356 such that the platform assembly 500 is positionable at any one of a plurality of desired tilt angles.

The platform assembly 500, illustrated in FIGS. 1, 2A-2C, and 14-18 primarily functions to receive and support the stretcher or litter 506 upon which the patient 20 is positioned. Moreover, the platform assembly 500 accommodates a fourth range of motion of the device 10. In the illustrated embodiment, the platform assembly 500 comprises an upper plate 512 interconnected with the interconnecting assembly 300, a plurality of linear bearings 518 mounted to the upper plate 512, at least one rail or cylindrical rod 524 and a litter platform 530 for receiving the litter 506. For purposes of allowing linear translational movement of the litter platform 530, litter 506 and patient 20 thereon relative to the upper plate 512 and base assembly 100, which facilitates the loading and unloading of the patient 20 in and from the helicopter, the rods 524 are secured to and move with the litter platform 530, the rods 524 being slidably captured or retained within the linear bearings 518 attached to the upper plate 512. The platform assembly 500 also includes a litter platform locking subassembly 550 which functions to selectively position the litter platform 530 relative to the upper plate 512, interconnecting assembly 300 and base assembly 100. In addition, the platform assembly 500 includes a litter engaging subassembly 580 which functions to retain or capture the litter 506 within the litter platform 530.

More specifically, and as shown in FIGS. 1, 3A-3B and 4, the base assembly 100 comprises a circular plate 106 which is rotatably captured or retained between a closure plate 116 secured to the underside of the base support plate 112 and an inwardly projecting annular lip 114 on the circular interior opening of the base support plate 112. In order to facilitate such capture while allowing rotation of the circular plate 106 relative to the base support plate 112, the circular plate 106 may include an annular tab 108. In this regard, the circular plate 106 is retained within the base support plate 112 due to the support of the closure plate 116 and the overlapping interface of the annular lip 114 and the annular tab 108. Rotation of the circular plate 106 relative to the base support plate 112 may be enhanced by positioning an annular bearing 118 having low friction characteristics between at least the lower surface of the annular tab 108 and the closure plate 116. In the illustrated embodiment, the annular bearing 118 comprises Teflon (TFE). A second Teflon bearing 120 may be positioned between the lower surface of the annular lip 114 and the upper surface of the annular tab 108 to further enhance rotation of the circular plate 106 relative to the base support plate 112. The Teflon bearings may have a rectangular, circular, elliptical or square cross-section. The closure plate 116 may be secured to the underside of the base support plate 112 by securing members selected from the group consisting of screws, pins, bolts, rivets and the like.

In order to selectively vary the rotational position of the circular plate 106 and the platform assembly 500 interconnected thereto, the rotational position of the circular plate 106 relative to the base support plate 112 may be selectively locked and released by a turntable locking subassembly 150. As illustrated in FIGS. 3A–3B and 4–6A and 6B, the turntable locking subassembly 150 is interconnected to the base support plate 112 and comprises a handle 154 operatively connected to a retractable spring plunger 162 which actuates at least one pin 158 upon rotation of the handle 154. The pins 158 of the retractable spring plunger 162 are receivable within correspondingly sized holes 110 in the circular plate 106. The hand retractable spring plunger 162 is manufactured by the Reid Tool Supply Co. and is available under Part No. PRSN-500S.

Figure 3B:
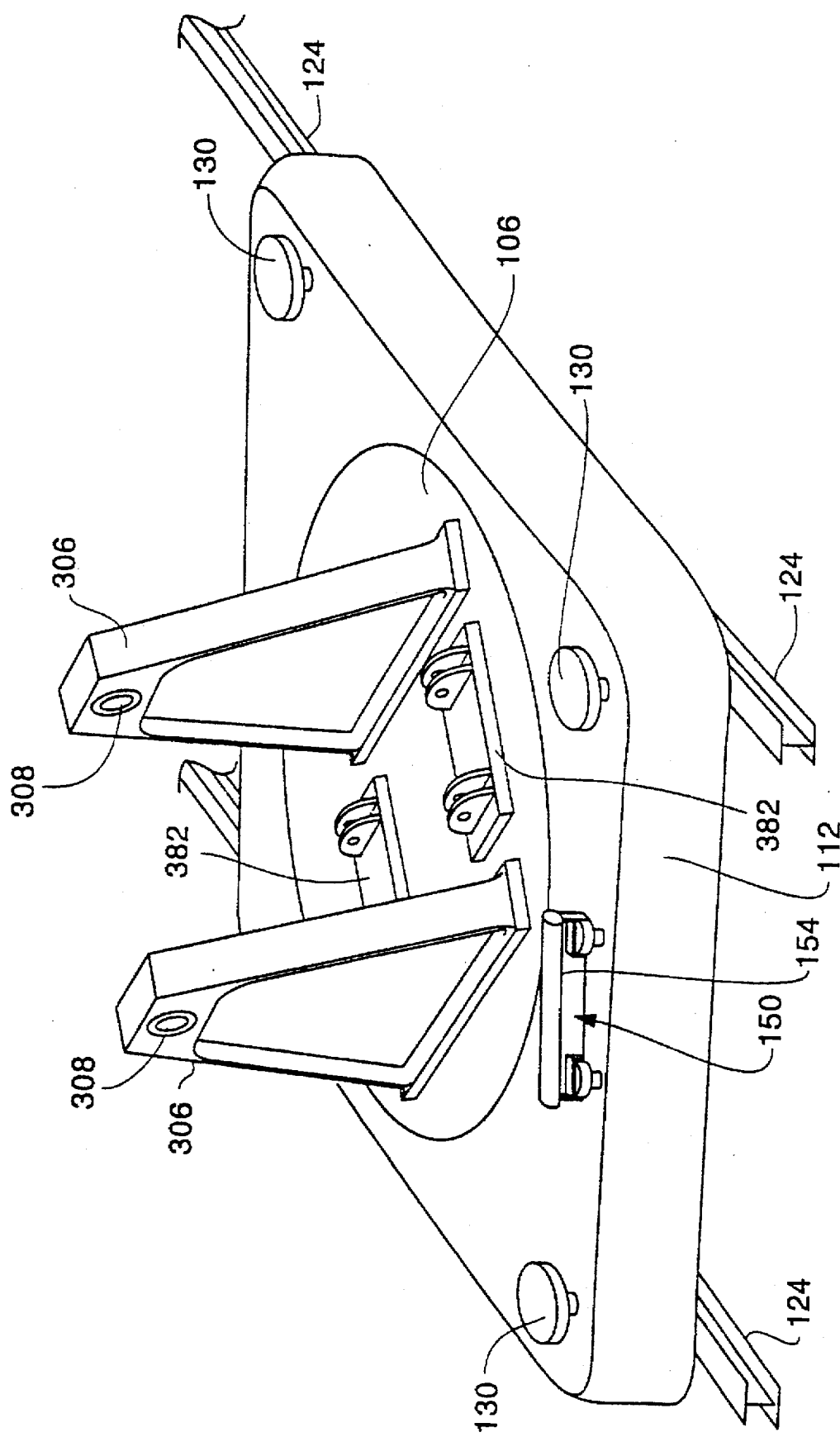
FIG. 3B is a perspective view of the base assembly of the device illustrated in FIG. 1 showing rotation of plate relative to the base support plate.
Figure 4:
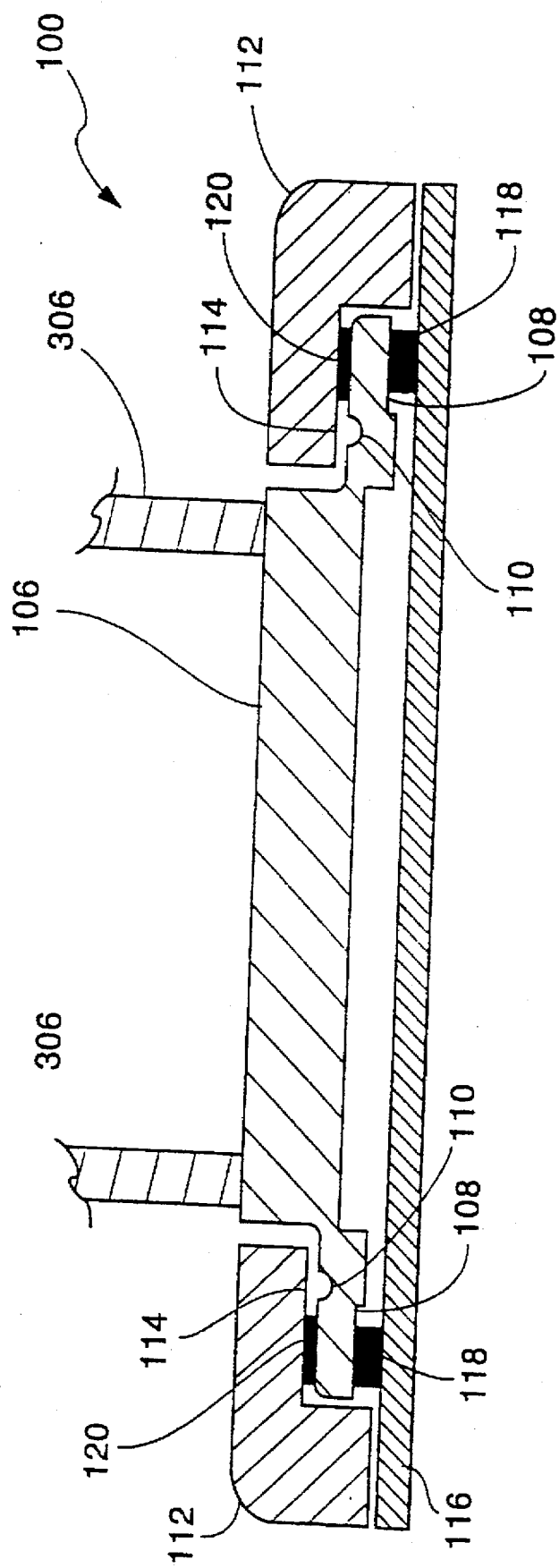
FIG. 4 is a cross-sectional view of the base assembly illustrated in FIG. 3A, taken along line 4—4.
Figure 5:
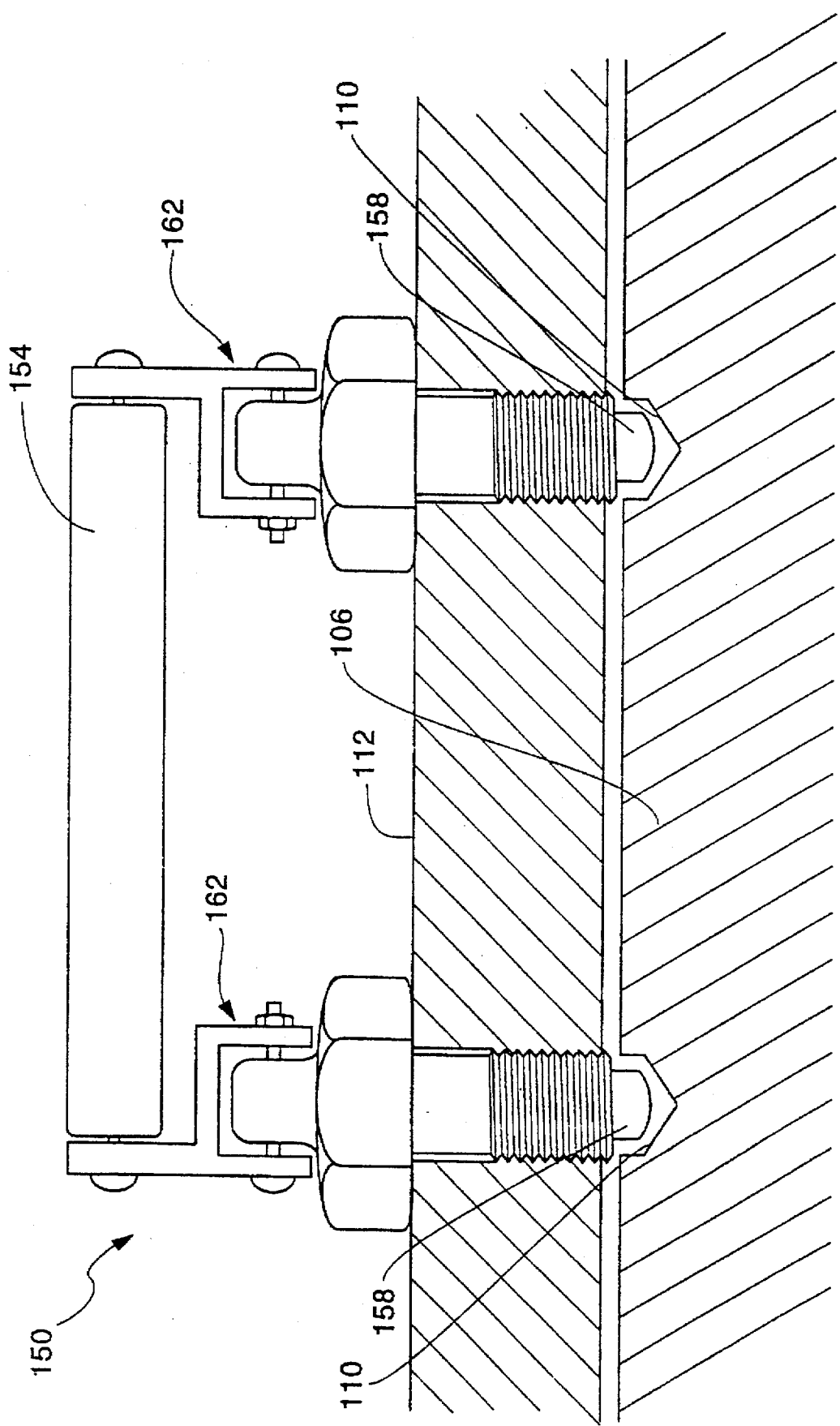
FIG. 5 is a cross-sectional view of the turntable locking subassembly of the base assembly illustrated in FIG. 3A, taken along line 5—5.
Figure 6:
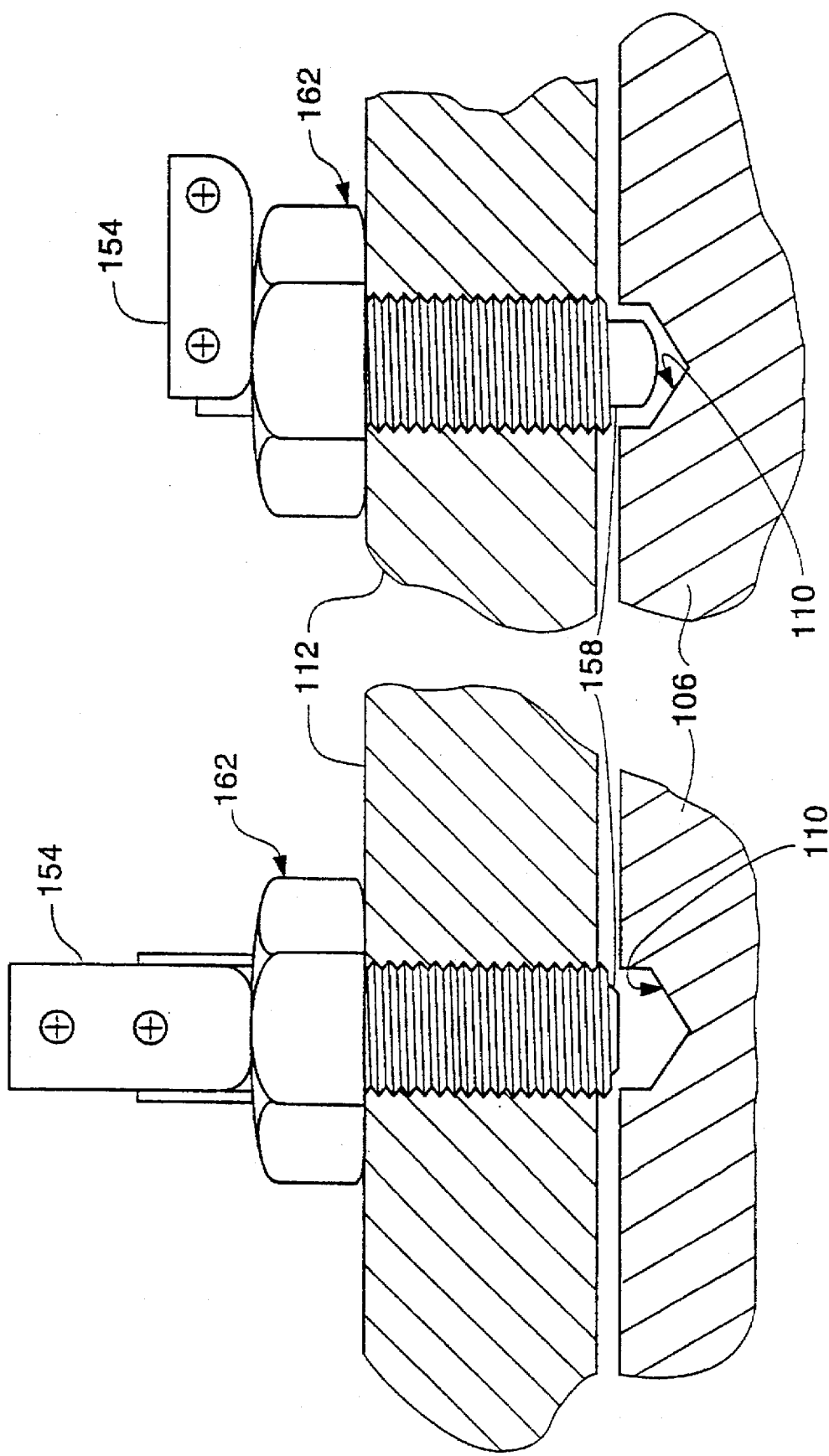
FIGS. 6A and 6B are cross-sectional views of the base assembly illustrated in FIG. 3A, taken along line 6—6, showing the turntable locking subassembly in unlocked and locked positions, respectively.

Thus, once a selected rotational position of the platform assembly 500 is achieved, as shown in FIGS. 3A and 3B, the operator may grasp and move the handle 154 downwardly, in an arcuate motion, in order to actuate the pins 158 downwardly such that the pins 158 enter the corresponding holes 110 in the upper surface of the circular plate 106. In the illustrated embodiment, shown in FIGS. 6A–6B, the holes 110 are positioned in the upper surface of the circular plate 106 such that rotation of the circular plate 106 relative to the base support plate 112 may be fixed or locked at 15° intervals when the handle 154 is rotated towards the base support plate 112. To release the turntable locking subassembly 150 for free rotation of the circular plate 106 relative to the base support plate 112, the operator may grasp and move the handle 154 upwardly, in an arcuate motion, in order to move the pins 158 upwardly, out of the holes 110 of the circular plate 106. This allows the circular plate 106 and platform assembly 500 to be freely rotatable relative to the base support plate 112. Alternatively, the holes 110 may be positioned on the side surface of the circular plate 106 and the turntable locking subassembly 150 oriented accordingly (not shown).

As noted above, the second range of motion of the device 10 involves translational motion along an axis transverse to the longitudinal axis 16 of the helicopter. In order to accommodate such motion, the base assembly 100 may be slidably mounted upon at least one track 124 (e.g., seat track) via a plurality of roller bearings 120. In the illustrated embodiment, shown in FIGS. 1, 7, 8A–8B and 9A–9B, two seat tracks 124 may be secured to the floor 14 of the helicopter such that the seat tracks 124 are parallel to each other and are oriented perpendicular to the longitudinal axis 16 of the helicopter. Two pairs of roller bearings 120 secured within brackets 122 may be mounted to the underside of the base support plate 112, proximate the corners of the base support plate 112 such that the two pairs of roller bearings 120 correspond to the distance between the two seat tracks 124.

FIG. 7 shows the seat tracks 124 having an I-beam cross-section. In this regard, the roller bearings 120 positioned within the brackets 122 may roll along the top surface of the seat tracks 124 until the desired transverse position is reached. The side structures 126 of the brackets 122 assist in maintaining rolling engagement between the roller bearings 120 and the upper surface of the seat track 124. In an alternative embodiment (not shown), the seat tracks may comprise c-shaped members.

Furthermore, the brackets 122 may also assist in maintaining the position of the base support plate 112 relative to the seat tracks 124 once the desired transverse position is reached. In this regard, the base assembly 100 may also include a seat track locking means. In one embodiment, shown in FIGS. 9A–9B, the base assembly 100 includes a seat track locking means comprising a plurality of thumb screws 130 threadedly receivable within a plurality of holes 132 in the base support plate 112 and a plurality of detents 136 in the seat track 124 which are capable of receiving an end portion of the thumb screws 130. When a desired translational position is reached, an operator lock the base assembly 100 in position by threading the thumb screws 130 downwardly such that the end portion of at least one of the thumbscrews 130 enters a corresponding detent 136. Furthermore, as the thumb screws 130 are threaded downwardly to lock the base assembly 100 in position, a plurality of tabs 128 extending inwardly from the side structures 126 of the roller bearing brackets 122 may frictionally engage the seat tracks 124. Thus, as the lower end of the thumb screw 130 engages the detent 136 in the upper surface of the seat track 124, the base support plate 112 and roller bearing brackets 122 attached thereto may be forced upwardly, away from the upper surface of the seat track 124, causing the upper surface of the tabs 128 of the roller bearing brackets 122 to frictionally engage the seat track 124. The base support plate 112 may be released at the desired time by unscrewing the thumb screws 130 to allow rolling engagement and movement of the roller bearings 120 relative to and on the seat tracks 124.

The interconnecting assembly 300, illustrated in FIGS. 1 and 10–13, provides for the third range of motion, substantially as described above. In particular, tilting (e.g., pitching) of the platform assembly 500 is accommodated by the interconnecting assembly 300. This is especially useful in treating a patient as the platform assembly 500 and patient 20 thereon can be tilted or articulated into an anti-shock position and into a reverse anti-shock position, as noted above. For example, the tilt action accommodates the medical needs of the patient 20 as it allows access to the patient's head facilitating all advanced airway procedures. In addition, tilting the platform assembly 500 such that the patient's head is elevated above the patient's feet may enhance medical treatment of some head wounds.

Specifically, the interconnecting assembly 300 comprises two lower brackets 306, two upper brackets 312 and a hinging means 318 interconnecting the upper and lower brackets 306, 312. The lower brackets 306 are securable to the circular plate 106, which includes a number of holes (e.g., through holes or threaded holes) (not shown) in the upper surface of the circular plate 106. In this regard, securing members (e.g., rivets, pins, screws, etc.) may be used to attach the lower brackets 306 to the circular plate 106. Similarly, in order to connect the interconnecting assembly 300 to the platform assembly 500, the upper brackets 312 are attachable to the underside of the upper plate 512 of the platform assembly 500 via securing members (e.g., rivets, pins, screws, etc.) which are received within holes (e.g., through holes or threaded holes) (not shown) of the upper brackets 312 and the upper plate 512. As will be described hereinbelow, the supporting means 350 also interconnects and extends between the platform assembly 500 and the base assembly 100.

In order to connect the lower brackets 306 to the upper brackets 312 while providing a platform assembly 500 that is tiltable and rotatable relative to the base support plate 112 of the base assembly 100, the lower and upper brackets 306, 312 are hingedly or pivotally interconnected by hinging means 318. To facilitate tilting of the platform assembly 500, the hinge means 318 is interposed between the upper plate 512 and the circular plate 106 such that the hinge means 318 is elevated relative to the circular plate 106. In this regard, the hinging means 318 accommodates tilting or pitching of the platform assembly 500 relative to the base assembly 100.

In the illustrated embodiment, the hinging means 318 includes bushings 324 and rods 328 which are receivable within adjacently positioned bores 308, 316 of the lower and upper brackets 306, 312, respectively. In order to accommodate the hinging means 318, the lower and upper brackets 306, 312 are positioned such that an upper side portion of each of the lower brackets 306 is proximate a lower side portion of each of the upper brackets 312.

The interconnecting assembly 300 may include supporting means 350 for use in supporting and counterbalancing the patient load, especially during tilting operations. In this regard, the supporting means 350 acts to counterbalance loads applied during tilting operations to thereby inhibit uncontrolled tilting of the platform assembly 500 and patient 20. As such and as will be described hereinbelow, the length of the supporting means 350 may be selected to dictate the desired degree of tilting of the platform assembly 500 relative to the base assembly 100. Furthermore, the supporting means 350 provides significant safety advantages as the supporting means 350 reacts to crash loads. In this regard, as crash loads in an aircraft can reach 6–20 times the force of gravity (g), the supporting means 350 may be designed to counteract and/or withstand such impact forces. It can thus be appreciated that the supporting means 350 are designed to translate forces and loads applied by and/or on the platform assembly 500 to the base assembly 100.

The supporting means 350 may comprise at least two telescoping members. Such telescoping members should counterbalance the patient load in an unlocked condition to avoid uncontrolled tilting, react to crash loads and patient loads in a locked condition (e.g., resist both tensile and compressive forces), and have sufficient throw (e.g., telescoping capability) to allow tilting of the platform assembly 500 to accommodate loading and unloading of the patient and to facilitate medical treatment of the patient. Of course, the degree of tilting attainable is governed not only by the length and throw of the telescoping members, but also by the distance between the platform assembly 500 and the floor 14 of the helicopter, which is determined by the heights of the lower and upper brackets 306, 312. Preferably, the telescoping members and height of the lower and upper brackets 306, 312 are selected such that the platform assembly 500 is controllable and tiltable in either direction at least between about 1° and about 60°, and more preferably, at least between about 5° and about 45°, and even more preferably, at least between about 10° and about 20°. In the illustrated embodiment, the platform assembly is tiltable in either direction between about 12° and about 15°. At least one telescoping member should be positioned on either side of the hinging means 318. The orientation of the telescoping members relative to the upper plate 512 and the circular plate 106, as well as the distance between the telescoping members, is dependent upon the length and throw of the telescoping members and the distance between the upper plate 512 and the circular plate 106. Also, the interior space available (e.g., cargo space) in the aircraft may also influence the degree of tilt, as well as the length of the telescoping members. Accordingly, the degree of controlled tilting possible is dependent upon these factors.

In illustrated embodiment shown in FIGS. 11A–11C and 13, the telescoping members comprise two pairs of struts 356 which extend between and interconnect the platform assembly 500 and base assembly 100. Each pair of struts 356 is positioned and oriented on each side of the hinging means 318 such that the platform assembly 500 is supported and controllable, especially during tilting operations. In this embodiment, the struts 356 are Bloc-O-Lift gas springs, which are oil- or gas-filled struts. These struts 356 are center pin actuated and manufactured by Stabilus, Part No. 292121000257/95. Such struts 356 are positioned and oriented relative to the upper plate 512 and the circular plate 106 to allow tilting of the platform assembly 500 of at least between about 12° and about 15° in either direction. In this embodiment, for purposes of supporting loads and reacting to crash loads, such struts 356 have a spring force of about 1000 Newtons (224 lbs), a locking force in compression of about 4000 Newtons (899 lbs) and a locking force in tension of about 4500 Newtons (1012 lbs). The stroke length of the struts 356 of the present invention is about 60 millimeters (2.36 inches) and has a total length (extended) of about 265 millimeters (10.43 inches). Alternatively, the supporting means 350 may comprise two struts (not shown), wherein a single strut may be positioned on each side of the hinging means 318, substantially as described above.

For purposes of controlling the platform assembly 500 during tilting operations such that the platform assembly 500 is sufficiently counterbalanced during tilting operations and lockable in a desired tilted position, the supporting means 350 is controllable by the actuating means 400. In this regard, an operator may grip or grasp the actuating means 400 about the platform assembly 500 to release and lock the supporting means 350 while tilting the platform assembly 500. For example, where the supporting means 350 comprises a plurality of telescoping members, the actuating means 400 controls the throw of the telescoping members. More specifically, when a specific degree of tilt of the platform assembly 500 is desired, the actuating means 400 may be activated by an operator gripping the handle of the actuating means 400, which is positioned about the platform assembly, to unlock the telescoping members from their present condition and throw, thus allowing the throw of the telescoping members to be varied until the desired tilt angle is achieved as the operator applies tilting forces to the platform assembly.

In one embodiment of the invention, shown in FIGS. 1, 10–14, where the telescoping members comprise center pin actuated struts 356, the throw of the struts 356 is varied by applying a force, via at least one of the handles 430, 432, on each of the center pins 362, which extend from the throw extensions 368 of the struts 356. Upon activation by either handle 430, 432, the actuating means 400 applies a generally upwardly oriented force against the center pins 362 to unlock the struts 356. In such an unlocked condition, the throw or length of the struts 356 may be varied to facilitate counterbalanced tilting of the litter platform 530 since the struts 356 react to both compressive and tensile loading. In this embodiment, the actuating means 400 applies an upwardly oriented force on the center pins 362 since the struts 356 are oriented such that the center pins 362 extend downwardly. For purposes of keeping the struts in good working order, such an orientation of the struts 356 is desirable as blood, dirt, debris and other contaminants are less likely to contact the center pins 362 and throw extension 368. In addition, a shroud may surround the interconnecting assembly 300 to keep the interconnecting assembly 300 clean.

In the illustrated embodiment, the actuating means 400 comprises a system of pulleys and cables interconnected with the actuating plates 420, each of which are positioned proximate the center pins 362 of the struts 356. For purposes of convenience and control of the platform assembly 500 during tilting operations, the actuating means 400 may be activated by at least one handle 430 positioned proximate the sides or ends of the litter platform 530. Once activated, the articulating plates 420 are moved into contact with the center pins 362 to actuate the center pins 362. In this unlocked condition, the degree of tilt of the platform assembly 500 may be varied until the desired degree of tilt is achieved. Once the desired degree of tilt is reached, the actuating means 400 is deactivated by the handle 430, which causes the articulating plates 420 to move downwardly, away from the center pins 362, to thereby lock the struts 356 in a specific throw position corresponding to the degree of tilt desired.

More specifically, in the illustrated embodiment, the actuating means comprises a handle 430 connected to a shaft 416 via a first cable 404 and pulleys 406, 408 and a lug 410 which is attached to the outer surface of the shaft 416. The shaft 416 may also be rotated via a second handle 432 connected directly thereto. The shaft 416 is rotatably attached to the underside of the litter platform 530 by brackets 418 and connected to the upper plate 512 via a shaft guide 412, the shaft 416 being rotatable and slidable with respect to the shaft guide 412 and the upper plate 512. Interfacing with the shaft 416 via a lug 411 on the shaft 416 and a second cable 422 attached thereto is an upper plate pulley 448, which is secured to the underside of the upper plate 512. The second cable 422 has a spherical member 424 at an end thereof for engagement with a spool pulley 414, which is operatively connected to a dual pulley 426 via a third cable 440. The dual pulley 426 is rotatably mounted to the spool yoke 428 which is interconnected to the lower brackets 306 of the interconnecting assembly 300. In this regard, while the dual pulley 426 is rotatable about the spool yoke 428, the dual pulley 426 does not move upwardly or downwardly with the spool pulley 414, which moves upwardly or downwardly relative to the upper plate 512 upon movement of one of the handles 430, 432 (as will be described hereinbelow). The dual pulley 426 includes two pulleys 436, 438 which operatively connects the spool pulley 414 (and therefore the handles 430, 432) to the actuating plates 420 via the third cable 440, which is wound about the dual pulley 426, a central dual pulley 442, the yoke pulleys 444, 446 and through and/or about the pins 421. Two actuating plates 420 are pivotally engageable on each of the yokes 380 at an end of each of the actuating plates 420 and hingedly interconnected to a corresponding actuating plate 420 via a pin 421, which is operatively connected to the cable 440. In this regard, rotation of at least one of the handles 430, 432 results in upward translation of the spool pulley 414, relative to the upper plate 512 and the dual pulley 426, which, in turn, raises the central dual pulley 446, which, in turn, pulls the pins 421 upwardly, which causes the actuating plates 420 to move toward the center pins 362 of the struts 356. Such action releases the struts 356 from a locked condition, which enables the platform assembly 500 to supportably tilt to a selected tilted position. Rotation of the handle(s) 430, 432 in the opposite rotational direction results in downward translation of the spool pulley 414, relative to the upper plate 512 and the dual pulley 426, which, in turn, causes the actuating plates 420 to move away from the center pins 362 of the struts 356. Such action locks the struts 356 at selected lengths for purposes of supporting the platform assembly 500, for example, in a desired tilted position.

In order to facilitate varying the throw of the struts 356 by applying a force against the center pins 362 and to allow space for actuation of the actuating plates 420, the center pins 362 are mounted to the yokes 380 at an elevated a distance above the circular plate 106. This provides space in which the actuating plates 420 may move against and away from the center pins 362 of the struts 356. The collars 172 of the throw extension portions 368 of the struts 356 are secured to yokes 380. This allows for extension of the struts 356 relative to the yokes 380. The yokes 380 are generally c-shaped members which are pivotally interconnected to the circular plate 106 via c-shaped brackets 382 and pins therebetween to facilitate tilting of the platform assembly 500 as the throw of the struts 356 is varied. In this regard, the yokes 380 are hingedly connected to the yoke brackets 382 by a pin and bushing arrangement through the bores in the yokes 380 and brackets 382. Similarly, the ends opposite the center pins 362 of the struts 356 may be pivotally secured to the upper plate 512 by brackets 516, shown in FIGS. 11A–11B.

Figure 2C:
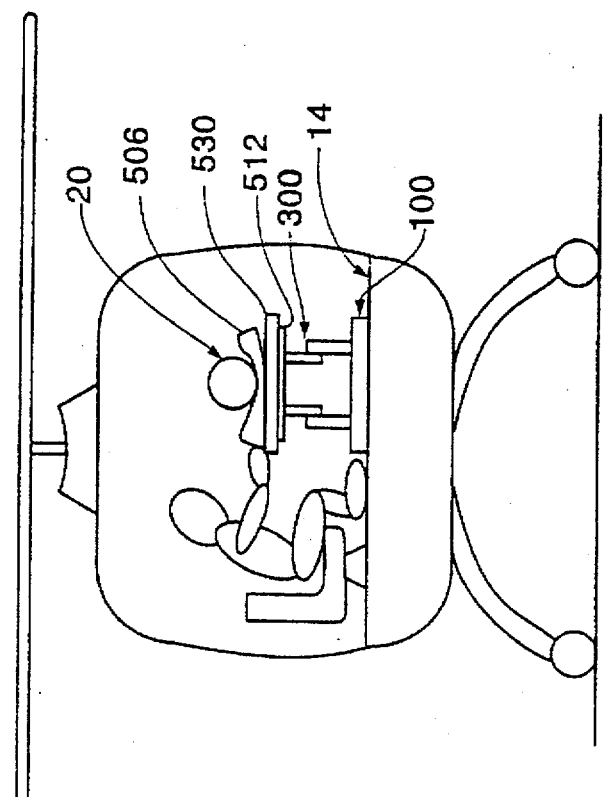
FIG. 2C is a front view of the device of FIG. 1 with a patient thereon loaded and rotated in a helicopter.
Figure 2B:
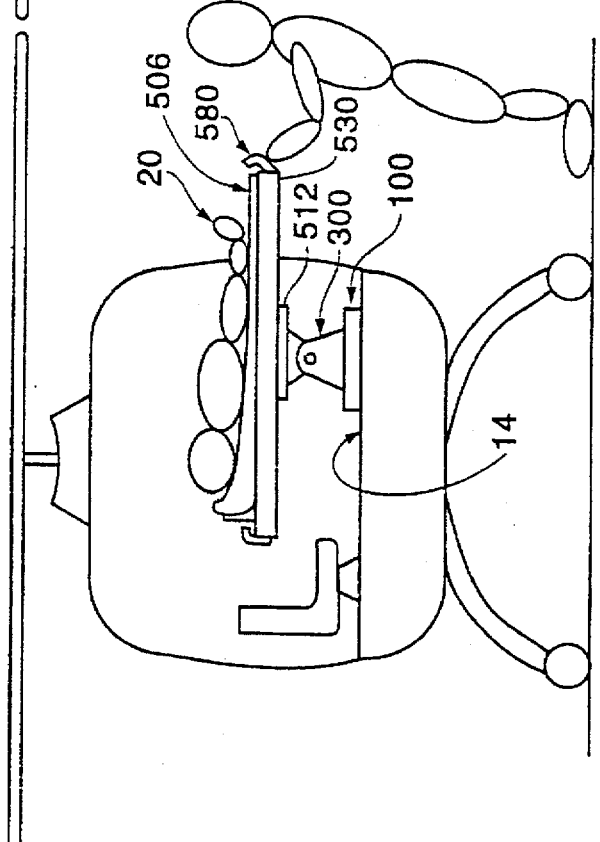
FIG. 2B is a front view of the device of FIG. 1 with a patient thereon loaded into a helicopter.

As noted above and illustrated in FIGS. 15–19, the fourth degree of motion is provided by the platform assembly 500. Initially, the platform assembly 500 comprises an upper plate 512 connected to the interconnecting assembly 300, a litter platform 530 slidably secured to the upper plate 512 via a litter slide means, and a litter 506 which supports the patient 20. Thus, the litter slide means provides the fourth degree of motion as it allows the litter platform 530 to slide relative to the upper plate 512 and base assembly 100 interconnected thereto. As illustrated in FIGS. 2A–2c, the litter slide means, combined with the tilting features of the device 10, may facilitate loading of the patient onto the helicopter as the litter 506 and the patient 20 thereon can engage the litter platform 530 substantially below the floor 14 of the helicopter.

In the illustrated embodiment, the litter slide means comprises a plurality of linear bearings 518 having roller bearings therein and at least one rod 524 slidably captured therein. The litter slide means includes four linear bearings 518 which are mounted on the top side of the upper plate 512 in positions corresponding to the position and orientation of the rods 524. The rods 524 may be oriented along a longitudinal axis of the litter platform 530 and may be attached to the underside of the litter platform 530. The linear bearings 518 are sized to slidably capture the rods 524 to allow slidable engagement between the litter platform 530 and the upper plate 512. Stops may be provided on the upper plate 512 or, alternatively, on the litter platform 530 to limit the length of sliding of the litter platform 530 relative to the upper plate 512. In this embodiment, the litter platform 530 may slide about 20 inches in either direction relative to a center point on the upper plate 512. Alternatively, the rods 524 may be attached to the top side of the upper plate 512 and the linear bearings 518 secured to the underside of the litter platform 530 (not shown).

Figure 17:
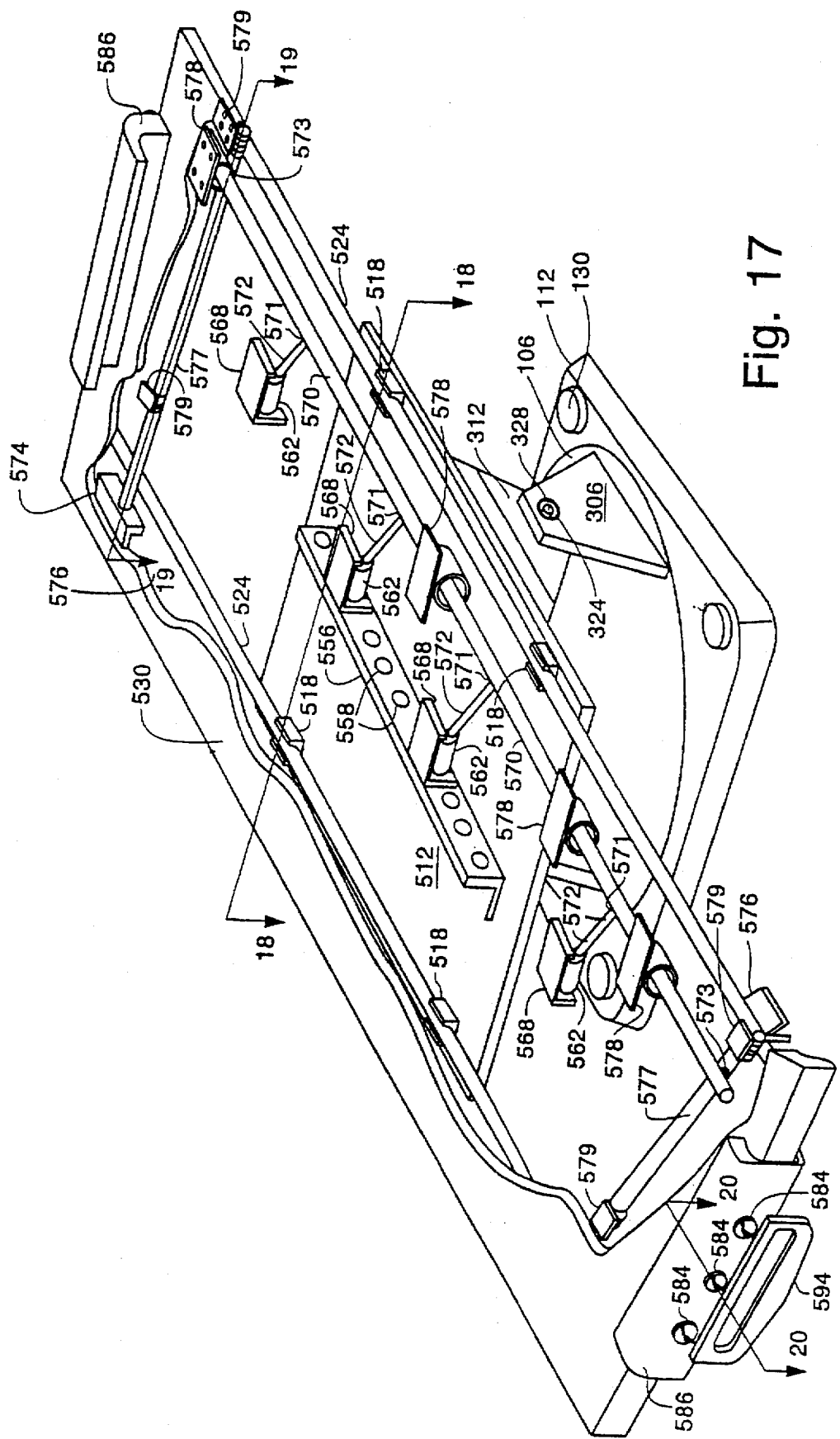
FIG. 17 is a perspective, cut-away view of the litter slide locking subassembly.
Figure 19:
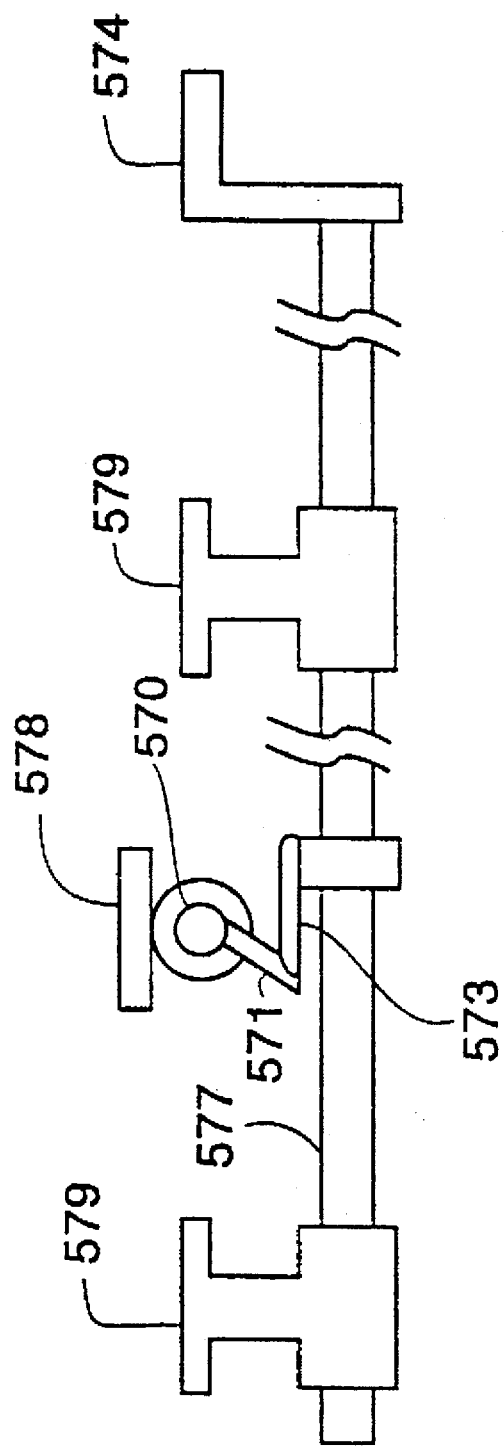
FIG. 19 is a cross-sectional view of the litter slide locking subassembly illustrated in FIG. 17, taken along line 19—19.
Figure 20B:
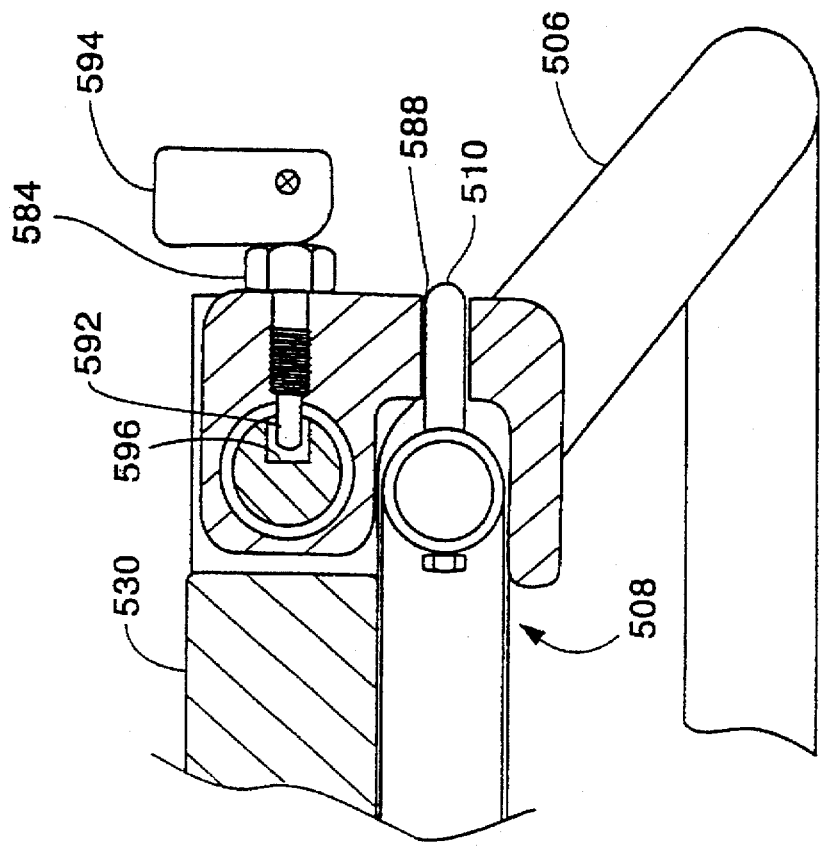
FIGS. 20A and 20B are cross-sectional views of the litter engaging means illustrated in FIG. 17, taken along line 20—20.
Figure 20A:
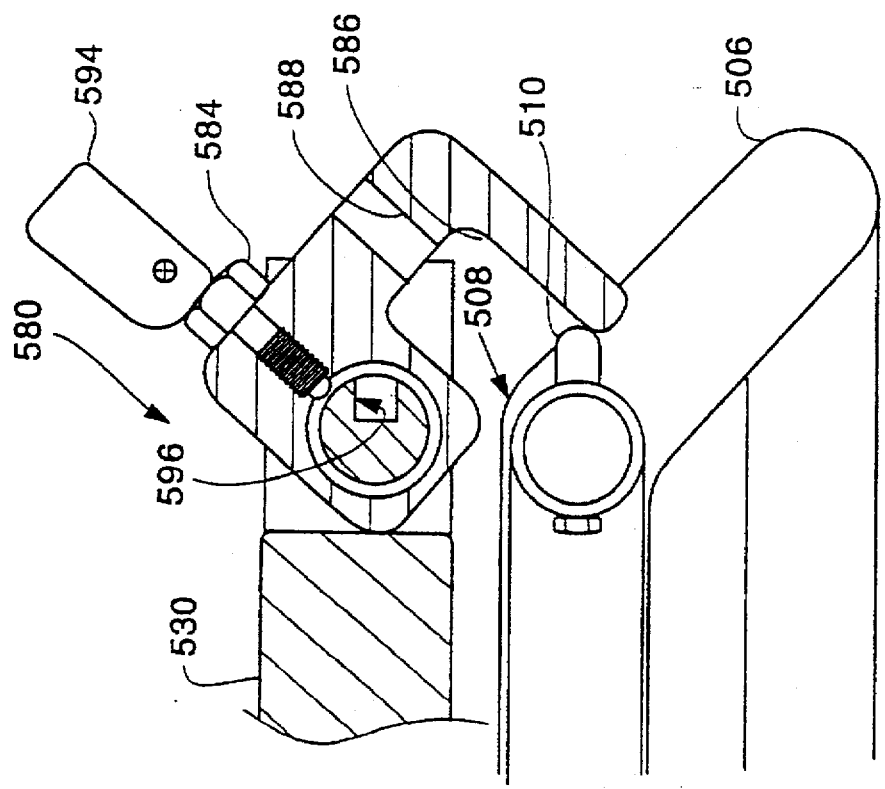

For purposes of selectively positioning the slidable litter platform 530 at a specific location relative to the upper plate 512 and base assembly 100 interconnected thereto, the platform assembly 500 may include a litter platform locking subassembly 550, shown in FIGS. 17–19. The litter platform locking subassembly 550 may comprise an upper plate bar 556 attached to the upper plate 512, a plurality of retractable spring plungers 562 having pins 566 extendable therefrom, a torque bar or tube 570 for engaging the plungers 562 to thereby extend and retract the pins 566. In order to facilitate operation of the plungers 562, a plurality of lugs 571 may be positioned on the surface of the torque tube 570. The plungers 562 may be attached to the underside of the litter platform 530 via brackets 568 and positioned proximate the upper plate bar 556 such that the pins 566 of the plungers 562 are extendable into any of a number of bores 558 in the upper plate bar 556. The torque tube 570 is attachable to the underside of the litter platform 530 via brackets 578.

In order to rotate the torque tube 570 such that the pins 566 of the plungers 562 extend and retract (depending upon the direction of rotation of the torque tube 570), each of the handles 574, 576 for rotating the torque tube 570 are operatively interconnected to the torque tube 570 via a rod 577 and a link 573, the rod 577 being slidable within the support brackets 579 which are attached to the underside of the litter platform 530. As illustrated in FIG. 19, the link 573 extends between a lug 571 on the torque tube 570 and a sleeve 575 which is fixedly attached to the rod 577. Thus, as the operator translates (e.g., slides) one of the handles 574, 576, the rod 577 slides within the brackets 579, causing the torque tube 570 to rotate. As noted above, such rotation of the torque tube 570 causes the pins 566 of the plungers 562 to extend or retract, to lock or release the litter platform 530 relative to the upper plate 512. Alternatively, the handles 574, 576 may engage the torque tube 570 via a system of pulleys and cables (not shown).

Of importance, the telescoping members (e.g., struts 356) may be actuated for tilting purposes as the litter platform 530 is translated linearly (e.g., slid) relative to the upper plate 512 since the actuating means 400 and litter platform locking subassembly 550 are independently operable by the operator. In fact, in the described embodiment, the handles 430, 432 of the actuating means 400 and the handles 474, 476 of the litter platform locking subassembly 550 may be operated by a single operator. In this regard, a handle for each of the actuating means 400 and litter platform locking subassembly 550 may be located proximate each other such that the right hand of the operator may control tilting operations via the actuating means 400 while the operator's left hand controls sliding operations via the litter platform locking subassembly 550. Of course, the handles of actuating means 400 and the litter platform locking subassembly 550 may be controlled by the left and right hands, respectively, of the operator. Furthermore, placement of these handles 430, 432, 474, 476 proximate the side and/or end of the litter platform 530 facilitates tilting or sliding operations as the operator is able to grasp about the litter platform 530 while engaging one or more of the handles.

Figure 16:
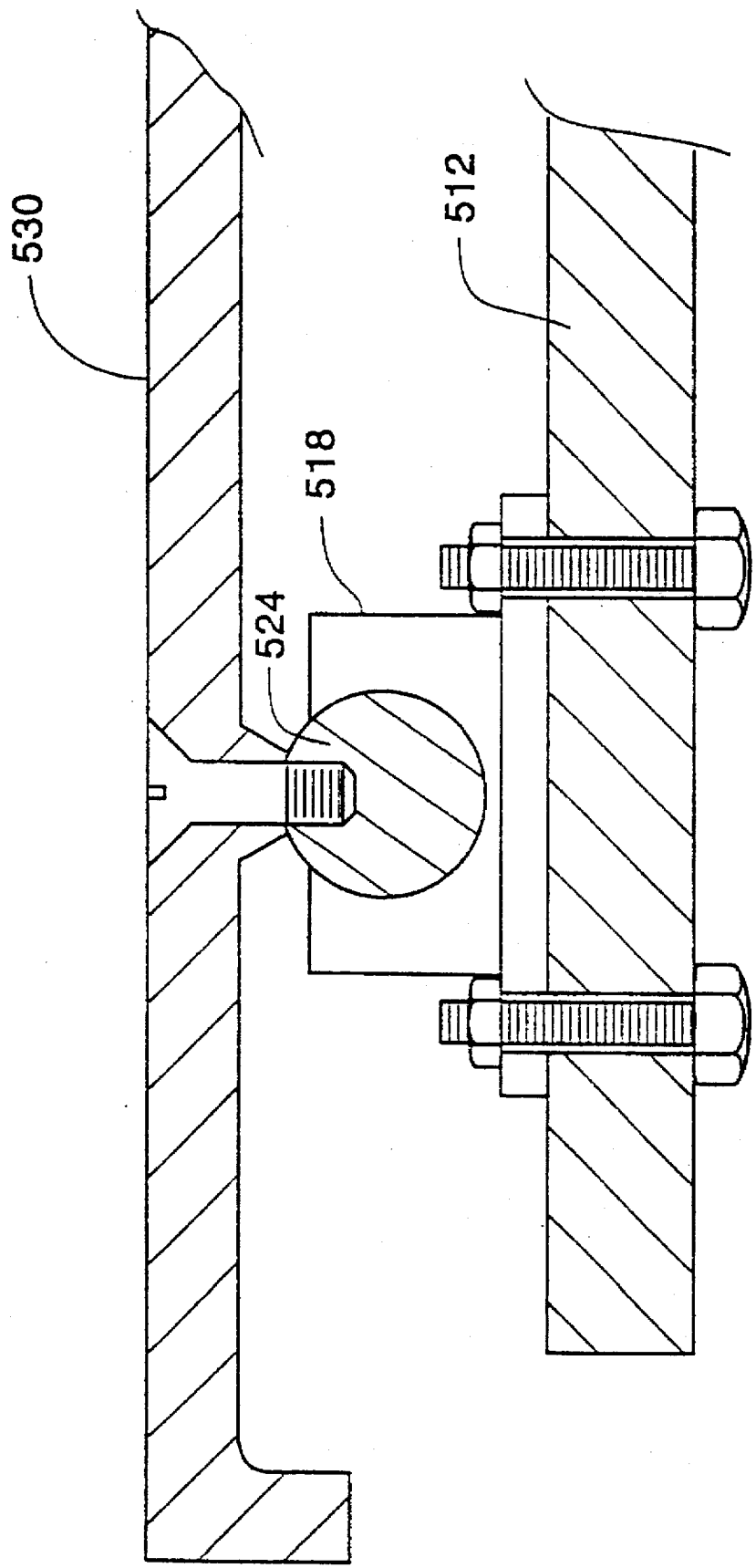
FIG. 16 is a cross-sectional view of the device illustrated in FIG. 15, taken along line 16—16, showing the litter slide means, with the litter platform thereon.

For purposes of securing the litter 506 on the litter platform 530, the platform assembly 500 may include a litter engaging subassembly 580, shown in FIGS. 16 and 18A and 18B. In one embodiment of the invention, a litter engaging subassembly 580 is positioned on each end of the litter platform 530 to secure a litter 506 therebetween by engaging end portions 508 of the litter 506. The litter engaging subassembly 580 may comprise a retractable spring plunger 584 and c-shaped member 586 which corresponds in configuration to the end portions 508 of litter 506. The handle 594 may be used to rotate the c-shaped member 586 in and out of position to secure and release an end portion 508. During such rotation, the handle 594 operatively engages the plunger 584 in order to actuate the pin 592 of the plunger 584 into (or out of, depending upon the rotation of the handle 594) the bore 596, which is positioned in the litter platform 530. In order to enhance the structural stability of the interface between the litter platform 530 and the litter 506, the end portions 508 of the litter 506 may include litter projections 510 and the c-shaped member 586 may include a corresponding number of bores 588 for receiving the litter projections 510.

The components of the base assembly 100, interconnecting assembly 300 and platform assembly 500 should exhibit superior strength and bending characteristics based upon the forces applied to the components, including crash loads. Moreover, in the interests of improving fuel economy and in view of the load carrying constraints for aircraft, the components for the device 10 should be lightweight. In this regard, major load bearing components of the device 10, including the circular plate 106, base plate support 112, closure plate 116, seat tracks 124, lower and upper brackets 306, 312, yokes 380, actuating plate 420, litter platform 530, litter 506, upper plate 512, upper plate bar 556, cylindrical rods 524 and c-members 594 may be fabricated from aluminum or steel alloys.

Figure 21:
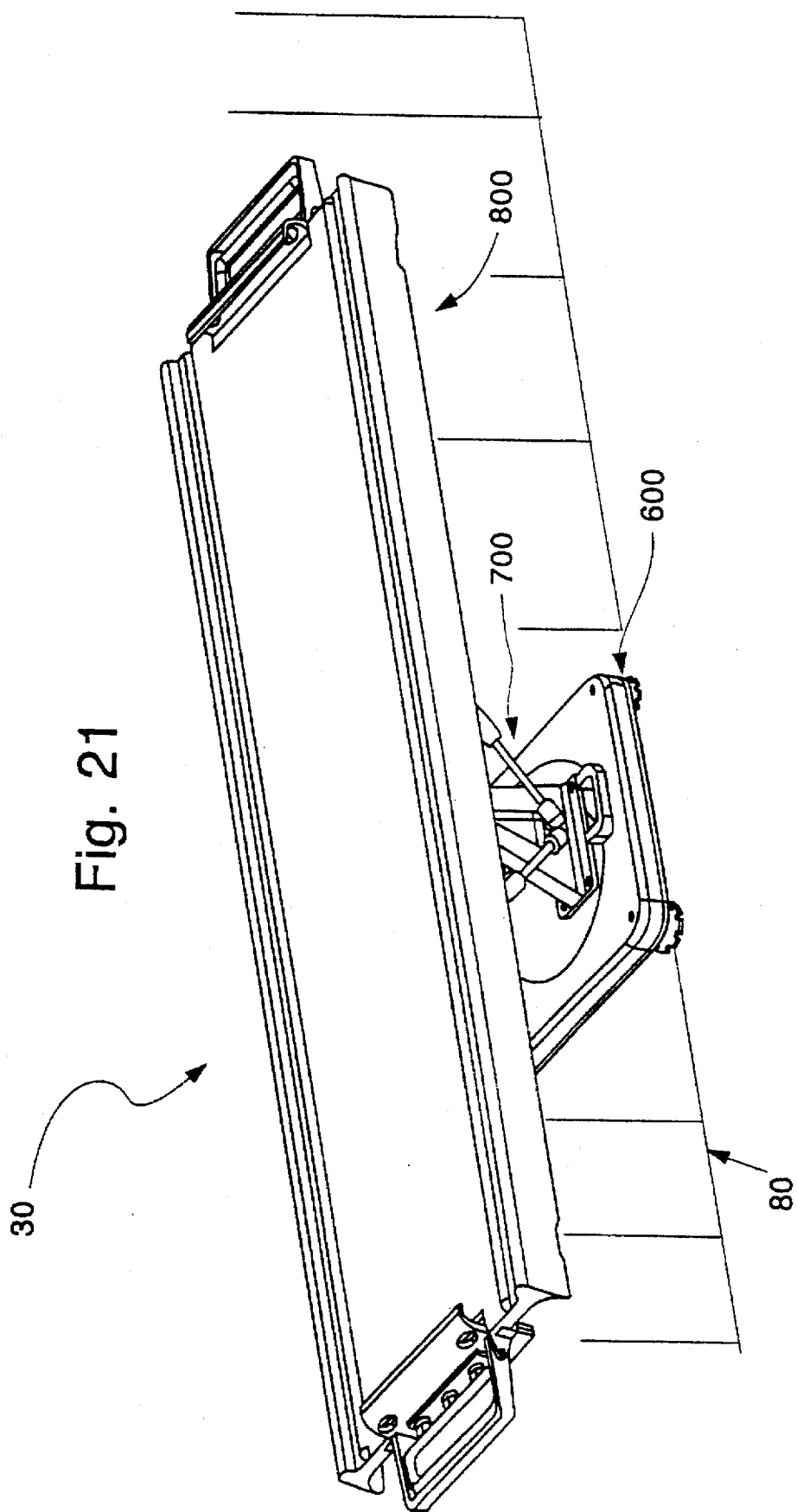
FIG. 21 is a perspective view of the device embodying the present invention.

FIGS. 21–35 illustrate another aspect of a patient loading system and transport device embodying the features of the present invention. Referring to FIG. 21, the device 30 generally comprises a base assembly 600, an interconnecting assembly 700 and a platform assembly 800 upon which a patient may be positioned. As illustrated in FIG. 21, the base assembly 600 is connectable to the floor 80 of a helicopter substantially as described hereinabove with respect to previously described embodiments of the device. The interconnecting assembly 700 extends between and interconnects the base assembly 600 and the platform assembly 800.

Figure 22:
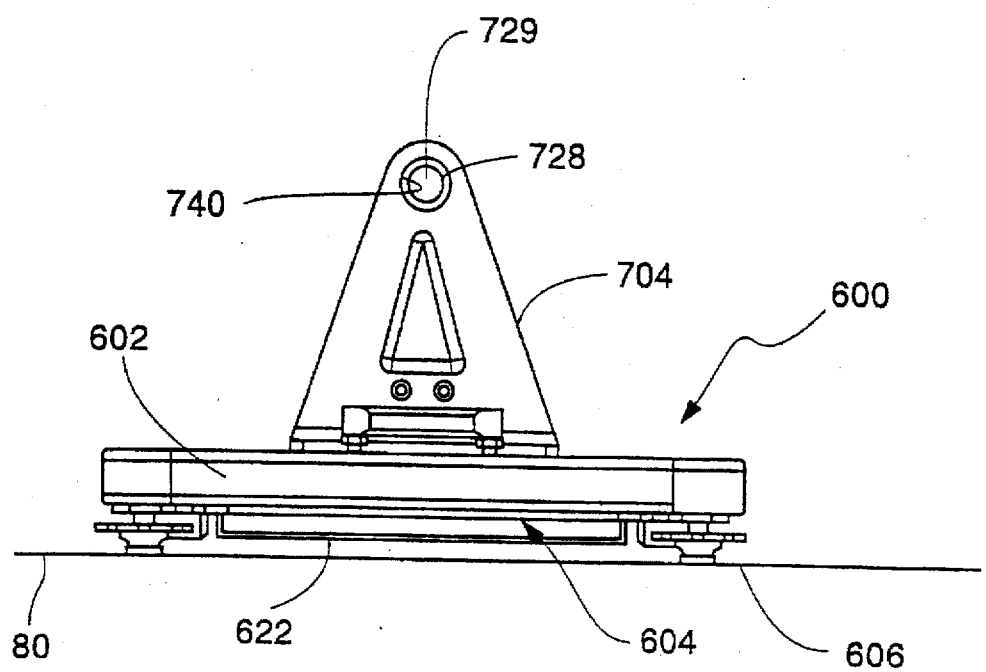
FIG. 22 is a side view of the base assembly showing the block and lower bracket.
Figure 23:
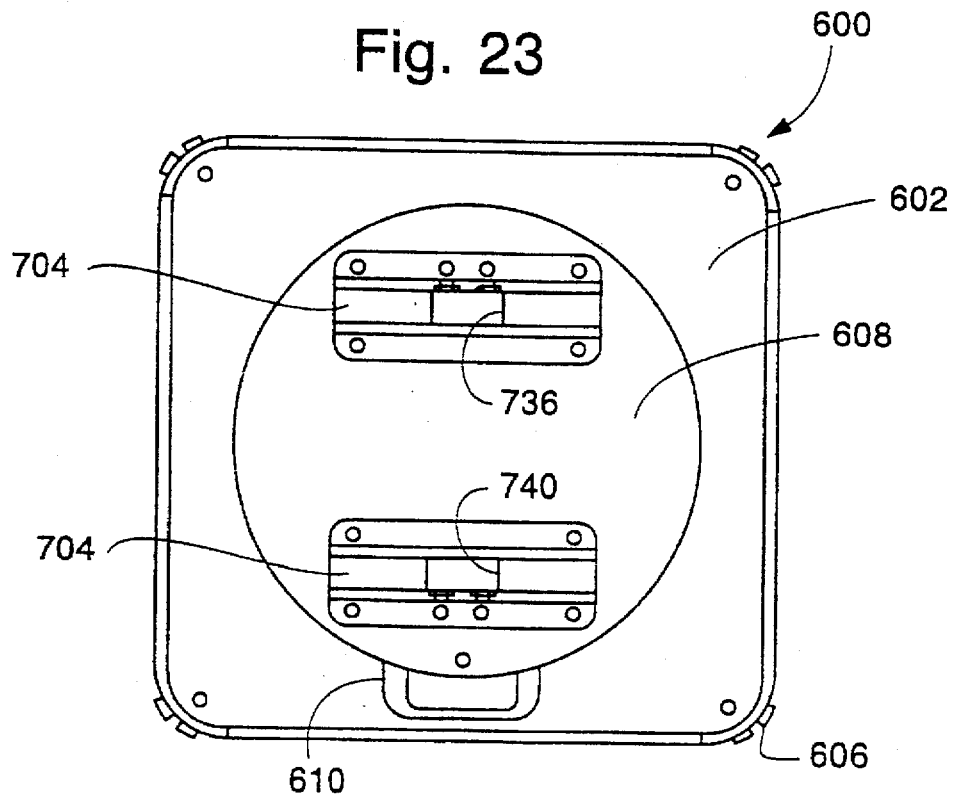
FIG. 23 is a top view of the base assembly showing the circular plate and the lower brackets.
Figure 24:
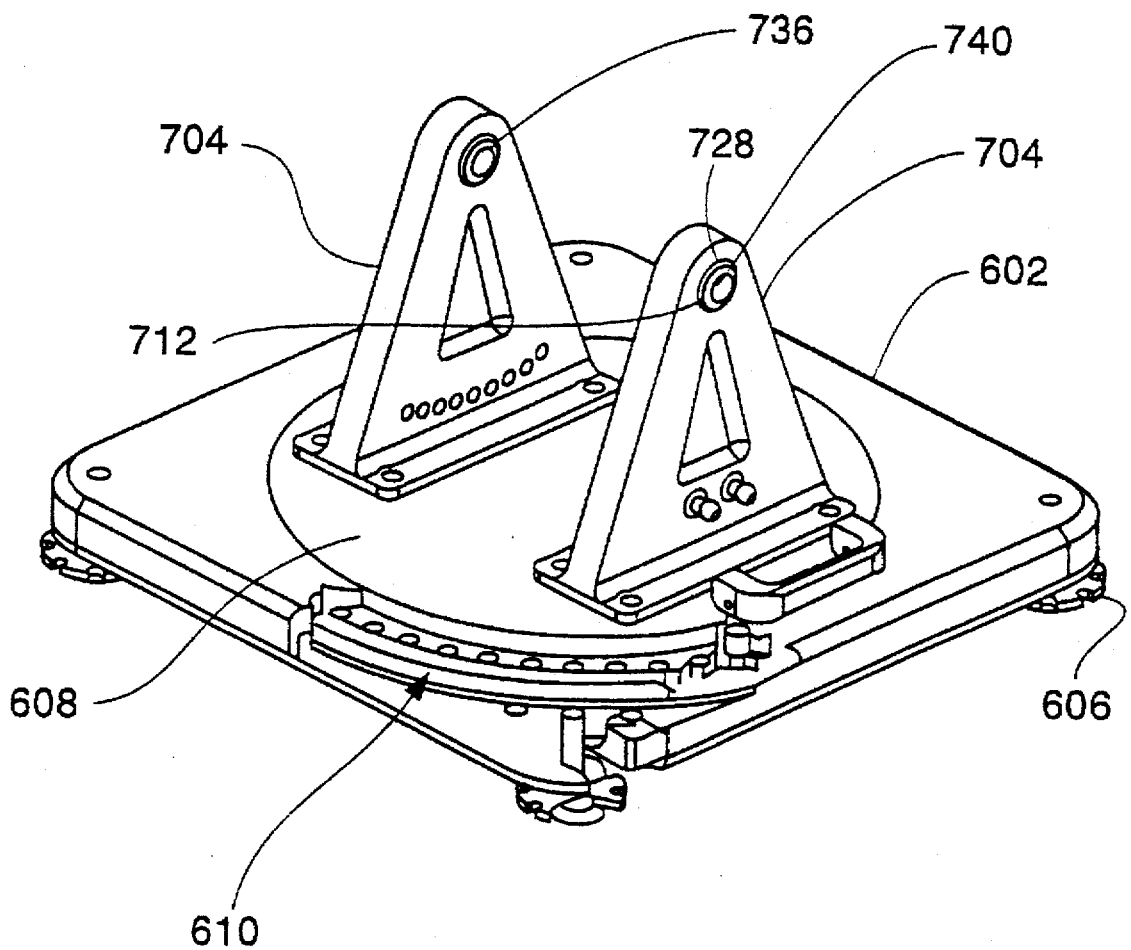
FIG. 24 is a perspective view of the base assembly showing the turntable locking subassembly and the lower brackets.

The base assembly 600 primarily functions to support the platform assembly 800 and patient thereon via the interconnecting assembly 700. As illustrated in FIGS. 22–24, the base assembly 600 includes a circular plate 608 which is rotatably captured within a base support plate 602, which is connected to the floor 80 of the helicopter. For purposes of selectively releasing and locking the circular plate 608 from or at a chosen rotational position, the base assembly 600 may also include a turntable locking subassembly 610, which locks the circular plate 608 in any one of a plurality of selected rotational positions relative to the base support plate 602, substantially as described hereinabove.

The base assembly may further include a block platform 604, as shown in FIG. 22, connected to the underside of the base assembly 600 such that the lower surface 622 of the block platform 604 is positioned just above the floor 80 of the helicopter. The block platform 604 is positioned such that when the device 30, and in particular, base assembly 600 is subjected to an overturning moment, the loads from an overturning moment will be directed into the helicopter floor 80 via legs of the base assembly and the block platform 604. In a preferred embodiment, for purposes of facilitating the direction of at least a portion of such forces into the floor 80, the lower surface 622 of the block platform 604 is positioned between about 0 inches to about 0.010 inches above the floor 80 of the helicopter. The block platform 604 may comprise a material selected for the group consisting of nylon and nylatron GS. Furthermore, for purposes of facilitating the translation of loads into the floor 80 of the helicopter, the block platform 604 may preferably withstand compressive forces of at least about 1300 psi, and preferably, at least about 1000 psi.

The interconnecting assembly 700, shown in FIGS. 21, 24–30, primarily functions to support the platform assembly 800 and to translate forces/loads applied on the platform assembly 800 to the base assembly 600. Furthermore, the interconnecting assembly 700 allows tilting of the patient and platform assembly 800 relative to the base assembly 600 to facilitate medical treatment of the patient. As such, the platform assembly 800 may be tilted or articulated into an anti-shock (Trendelenburg) position and into a reverse anti-shock (Reverse Trendelenburg) position to accommodate the medical needs of the patient.

Figure 25:
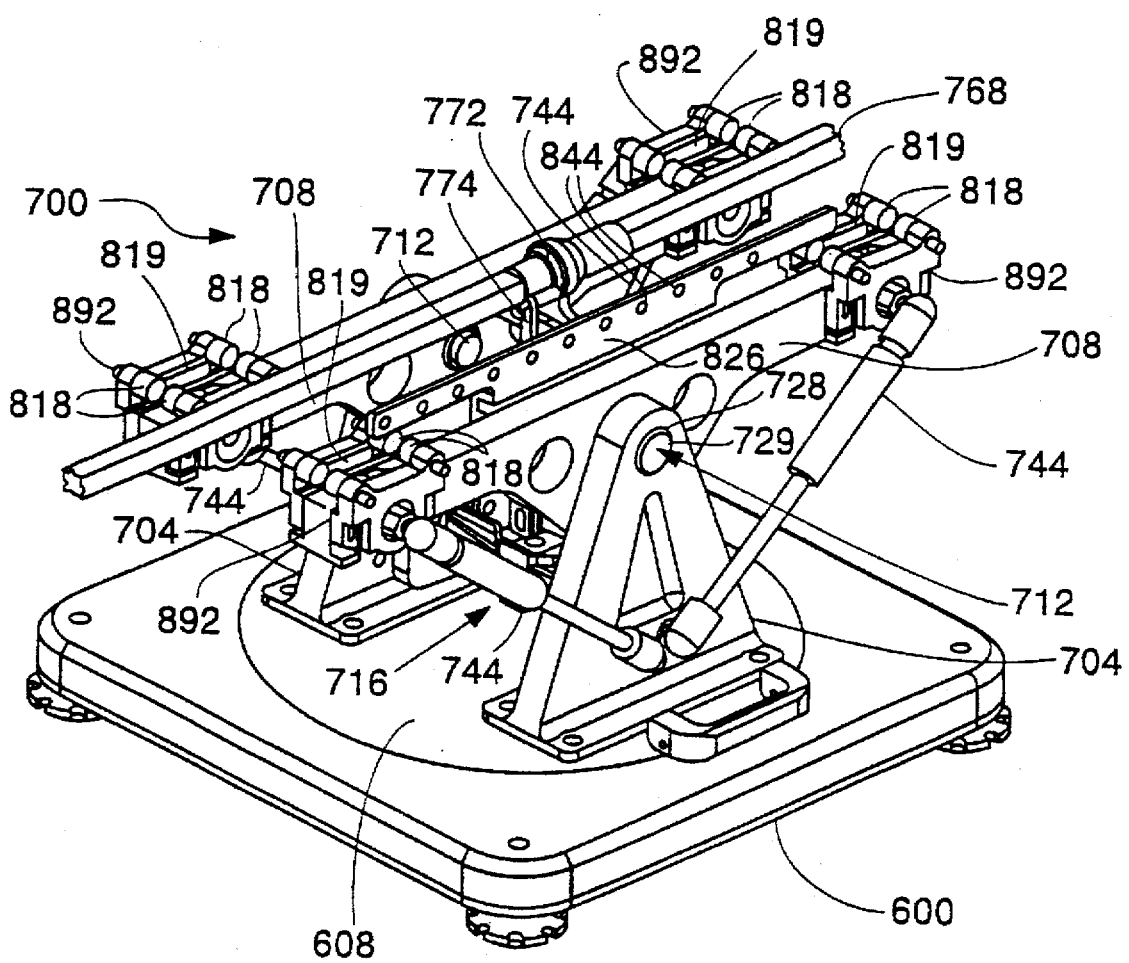
FIG. 25 is a perspective view of the interconnecting assembly of the device illustrated in FIG. 21.

As illustrated in FIG. 25, the interconnecting assembly 700 comprises two lower brackets 704, two upper brackets 708 and a hinge means 712 interconnecting the lower and upper brackets 704, 708. The lower brackets 704 are securable to the circular plate 608 in the base assembly 600. The upper surface of the circular plate 608 includes a number of holes for which securing members, such as rivets, pins, screws, etc., may be used to attach the lower brackets 704 to the circular plate 608. Similarly, the upper brackets 708 are attachable to the underside of the platform assembly 800 via sliding means 810, as will be described in more detail below.

Figure 26:
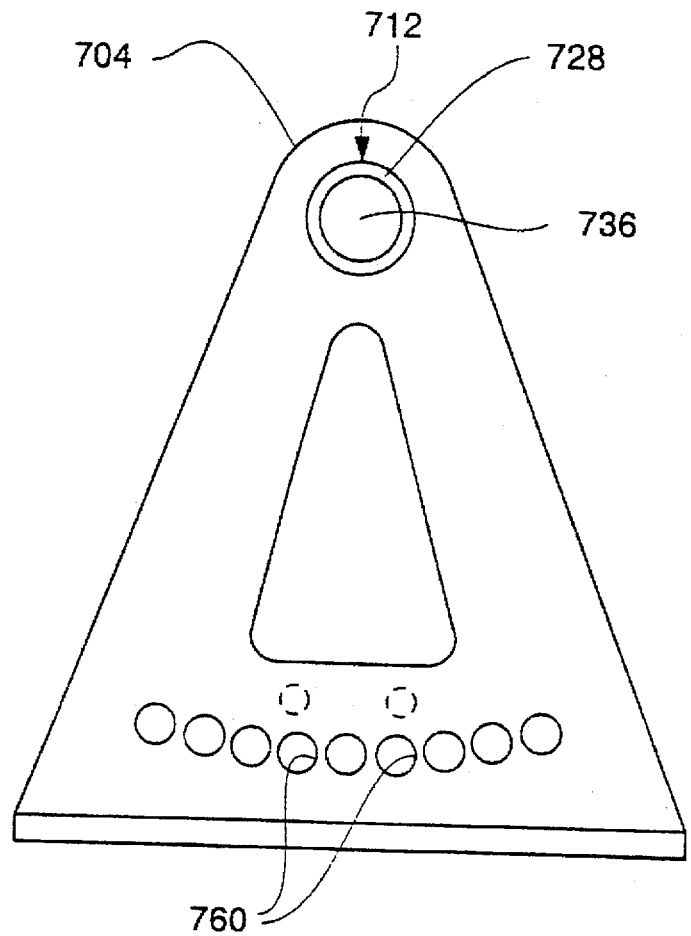
FIG. 26 is a side view of the lower bracket showing the hinge means and the channels.

To facilitate tilting of the platform assembly 800, the lower and upper brackets 704, 708 are pivotally interconnected by hinge means 712. The hinge means 712 is interposed between the platform assembly 800 and the base assembly 600 such that the hinge means 712 is elevated relative to the base assembly 600. As illustrated by FIGS. 24, 26, the hinge means 712 may comprise bushings 728 and rods 729 which are receivable within adjacently positioned bores 736, 740 of the lower and upper brackets 704, 708 respectively.

The interconnecting assembly 700, as illustrated in FIG. 25, may also include supporting means 716 for supporting and counterbalancing the patient load, especially during tilting operations. The supporting means 716 act to counterbalance loads applied during tilting operations to thereby inhibit uncontrolled tilting of the platform assembly 800 and the patient. It can thus be appreciated that the supporting means 716 are designed to translate forces and loads applied by and/or on the platform assembly 800 to the base assembly 600.

In the illustrated embodiment shown in FIG. 25, the supporting means 716 comprises a plurality of telescoping members. The telescoping members extend between and interconnect the upper brackets 708 and the lower brackets 704 of the interconnecting assembly 700. The telescoping members may comprise gas springs, hydraulic cylinders, pneumatic cylinders, and mechanical levers and springs. Such telescoping members must have sufficient throw (e.g., telescoping capability) to counterbalance the patient load and allow controlled tilting of the platform assembly 800 to facilitate medical treatment of the patient. The degree of tilting attainable is governed by the length of the telescoping members, the throw of the telescoping members and the distance between the base assembly 600 and the platform assembly 800, which is determined by the heights of the lower and upper brackets 704, 708. Preferably, the platform assembly 800 is tiltable in either direction at least between about +10° and about −10°. More preferably, the platform assembly 800 is tiltable in either direction at least between about +15° and about −15°. Even more preferably, the platform assembly 800 is tiltable in either direction at least between about +45° and about −45°.

Figure 29:
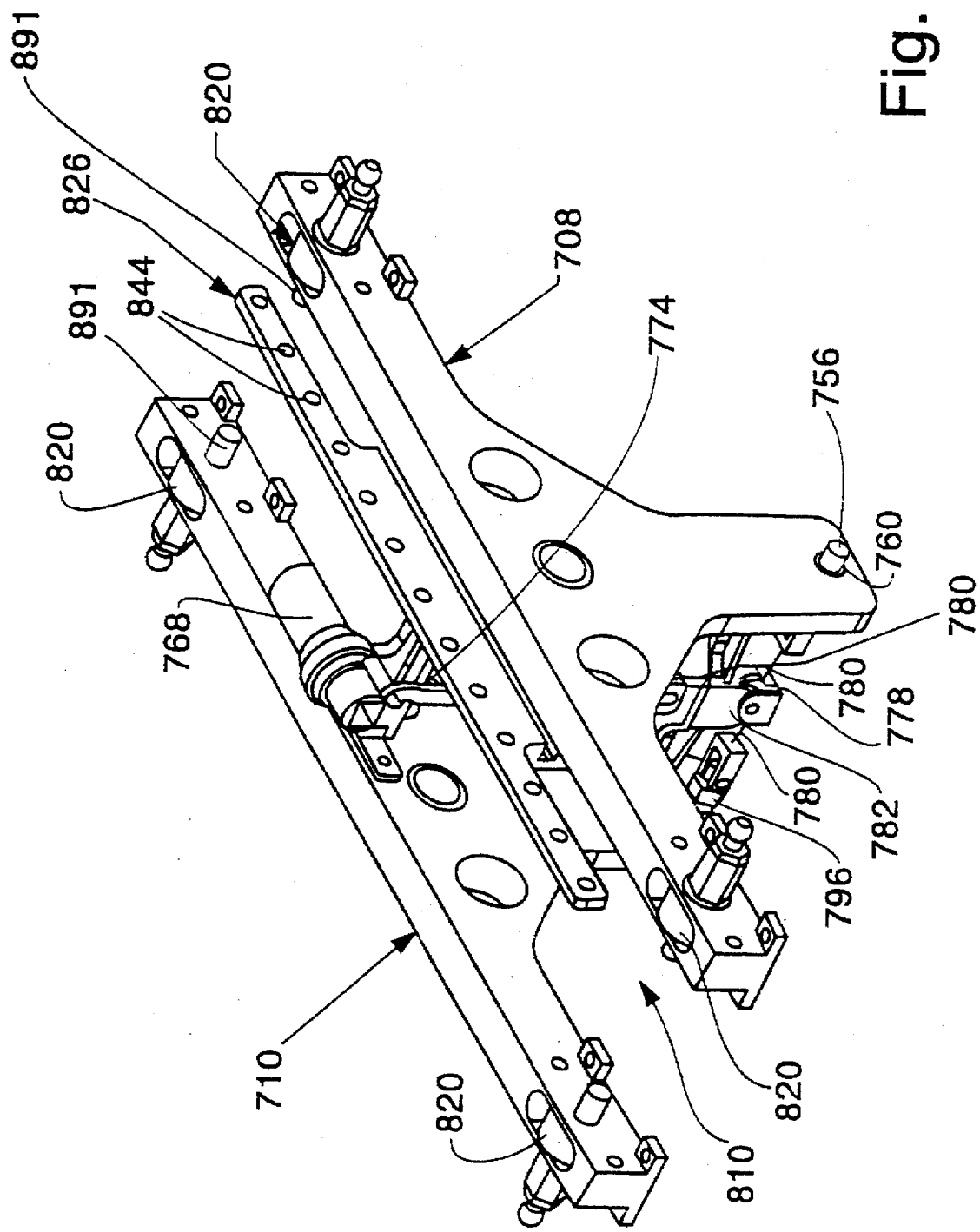
FIG. 29 is a perspective view of the interconnecting assembly of the device illustrated in FIG. 21.

In the illustrated embodiment, shown in FIGS. 25 and 29, the telescoping members comprise two pairs of gas springs (e.g., shock absorber-like members) 744 which extend between and interconnect the lower and upper brackets 704, 708 of the interconnecting assembly 700. Each shock absorber 744 is pivotally connected to and extends between the lower bracket 704 and the upper bracket 708. More specifically, the shock absorber 744 may be pivotally connected to the trolley bracket assembly 842 which is attachable to the upper bracket 708. As such, the shock absorber 744 is connected to a shaft 891 which passes through a clearance hole 893 in the trolley bracket assembly 842. For purposes of supporting loads, such shock absorbers 744 may have a spring force of between about 75 lbs. and about 200 lbs. The stroke length of the shock absorbers 744 of the present invention is about 3.2 inches and has a total extended length of about 9.6 inches and a compressed length of about 6.5 inches. In this embodiment, the shock absorbers 744 are manufactured by Stabilus, Part No. H9510.

The interconnecting assembly 700 also includes means for selectively tilting the platform assembly 800, relative to the base assembly 600, to one of a plurality of tilt positions. In one embodiment of the invention, shown in FIGS. 26–30, the selectively tilting means comprises a selectively retractable locking subassembly 794. The selectively retractable locking subassembly 794 comprises two spring plunger 796 each having a pin 798 extendable therefrom, the pins 798 being selectively engageable within the channels 760 located in the lower brackets 708, 704 of the interconnecting assembly 700. In this regard, withdrawing and disengaging the pins 798 from the channels 760 allows for varying the degree of tilt of the platform assembly 800. Once the desired degree of tilt is reached, the pins 798 may be extended into and engaged within the channels 760, thereby locking the platform assembly 800 in a selected tilt position.

Figure 28:
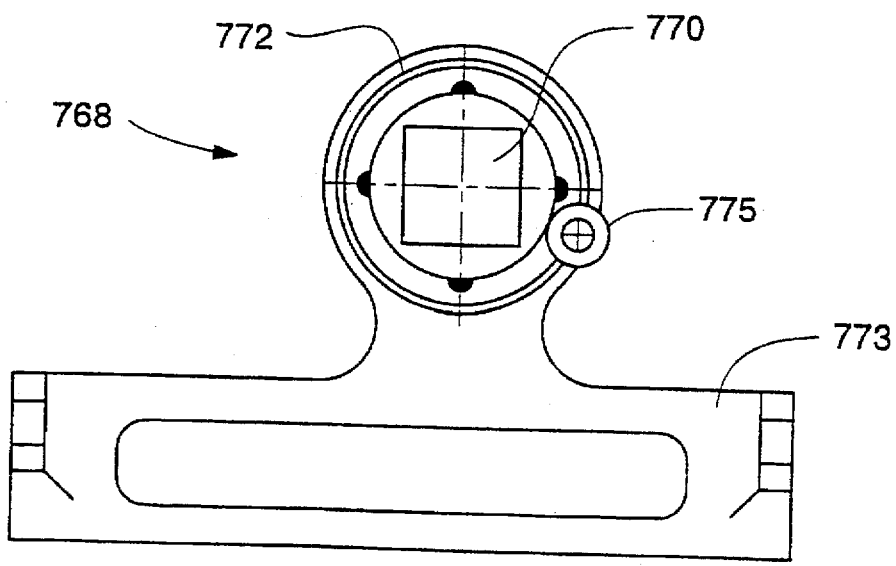
FIG. 28 is a cross-sectional view of the tube assembly showing the square shaft and sleeve.
Figure 27:
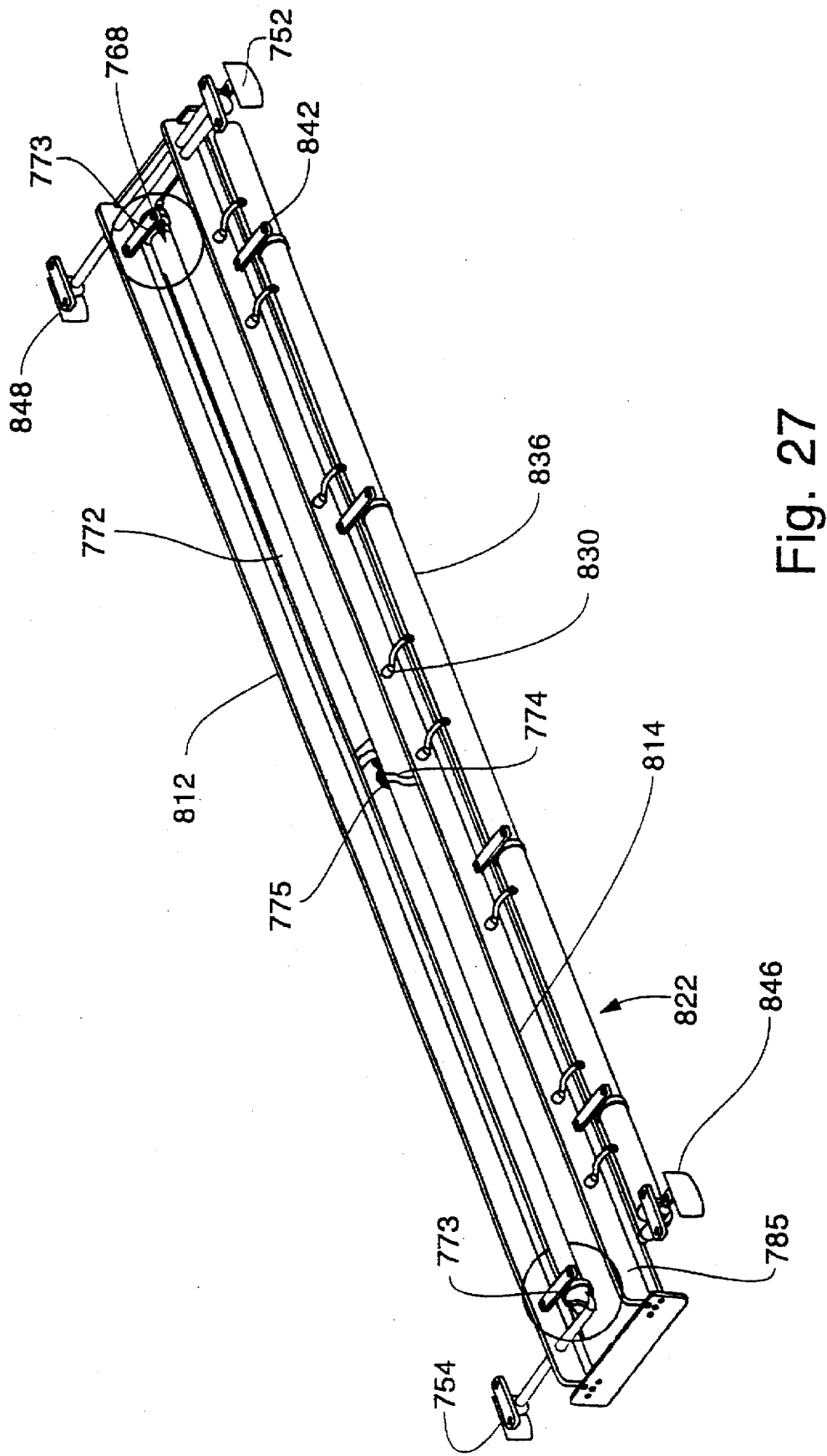
FIG. 27 is a perspective view of the base slide locking subassembly and components of the retractable locking subassembly, located under the litter platform of the device illustrated in FIG. 21.
Figure 35:
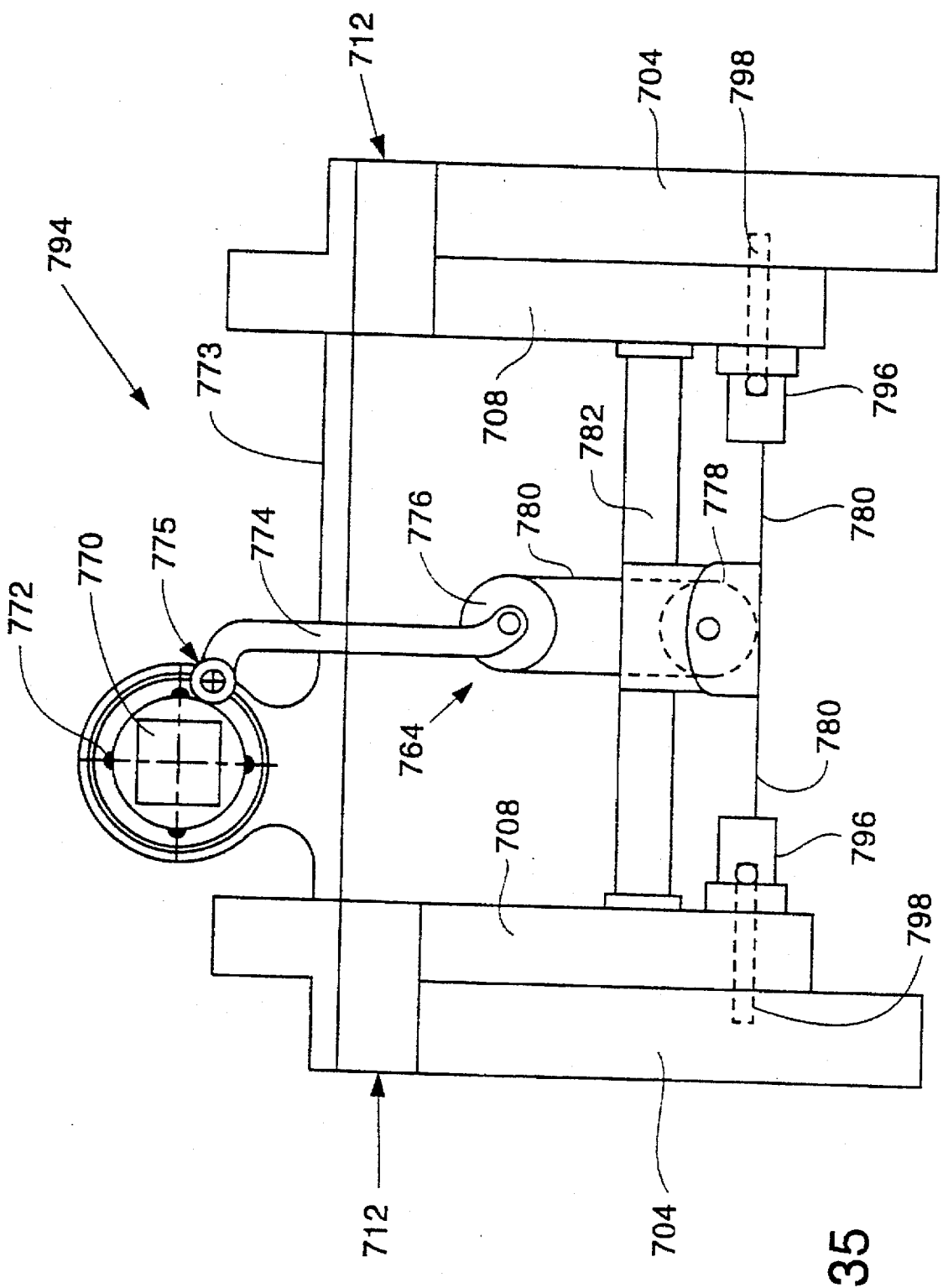
FIG. 35 is an end view of the selectively retractable locking subassembly showing the pulley fork, the pulley system, the spring plungers, the pulley bridge and the upper and lower brackets.

More specifically, as shown in FIGS. 27, 28, 35, the selectively retractable locking subassembly 794 comprises handles 752, 754, a tube assembly 768 and a pulley system 764. The handles 752, 754 are positioned proximate the sides or ends of the platform assembly 800 to facilitate access and actuation by an operator. The tube assembly 768, comprises a square shaft 770 rotatably positioned within a sleeve 772 and connected to the underside of the platform assembly 800 by brackets 773. The handles 752, 754 are operatively connected to the square shaft 770 of the tube assembly 768 such that actuation of either of the handles 752, 754 results in rotation of the sleeve 772, which, in turn, results in actuation of the spring plungers 798 (which will be described in more detail hereinbelow).

Figure 30:
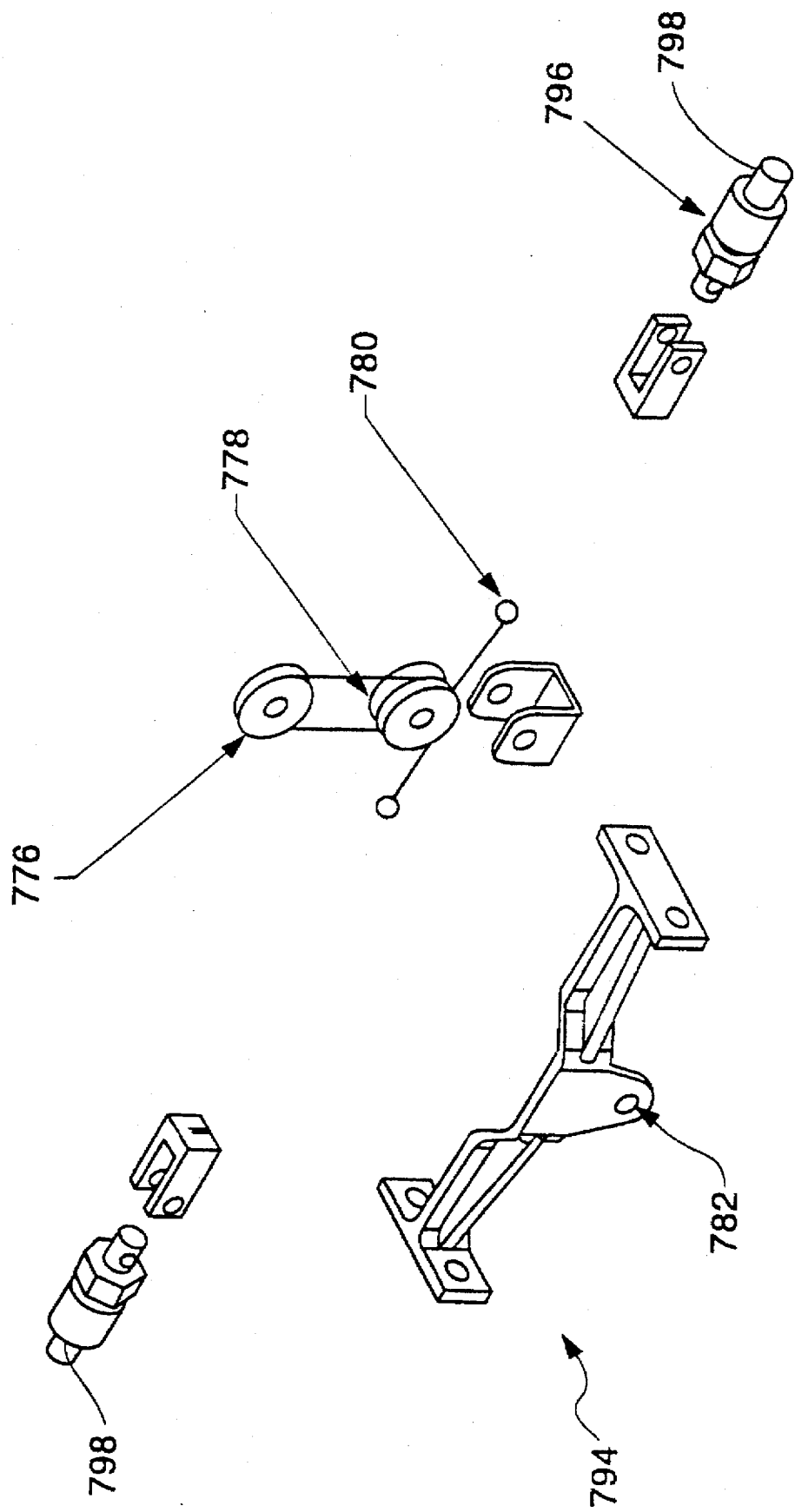
FIG. 30 is a perspective view of the pulley system of the selectively retractable locking subassembly.

The tube assembly 768 is operatively connected to a pulley fork 774 via a lug 775, as illustrated in FIGS. 29, 30, 35. In this regard, the rotation of one of the sleeve 772 and the square shaft 770 by one of the handles 752, 754 results in clockwise or counter-clockwise movement of the lug 775 to move the pulley fork 774. The pulley fork 774 is interconnected to a pulley system 764, which comprises a first pulley 776 and a second pulley 778 interconnected by a cable 780 to two spring plungers 796 each having a retractable pin 798. The first pulley 776 is rotatable mounted to the pulley fork 774. A pulley bridge 782 is positioned between and is interconnected to the two upper brackets 708 of the interconnecting assembly 700. The second pulley 778 is rotatably mounted on the pulley bridge 782 such that the second pulley 778 is rotatably secured in a stationary position relative to the pulley bridge 782 and the first pulley 776.

As such, moving one of the handles 752, 754 may cause the square shaft 770 and sleeve 772 in the tube assembly 768 to rotate counterclockwise. Counterclockwise rotation of the tube assembly 768, in turn, raises the pulley fork 774 via the lug 775, which, in turn, raises the first pulley 776 relative to the second pulley 778. Since the second pulley 778 is rotatably mounted in the pulley bridge 782 and interconnected to the first pulley 776 via the cable 780, raising the first pulley 776 relative to the second pulley 778 actuates the spring plungers 796 to withdraw the pins 798 of the spring plungers 796 from the channels 760, thereby disengaging the pins 798 from the channels 760. Such movement of the first pulley 776 acts to retract the pins 798 from the channels 760 in the lower bracket 704 of the interconnecting assembly 700.

Once the pins 798 have been withdrawn and disengaged from the corresponding channels 760, the platform assembly 800 is tiltable relative to the base assembly 600. In this regard, the operator may apply tilting forces to the platform assembly 800 to tilt or articulate the platform assembly 800, thereby tilting the patient thereon. In order to facilitate and control the tilting of the platform assembly 800, the throw of the shock absorbers 744 is varied until the desired tilt angle is achieved. As such, the shock absorbers 744 function to support (e.g., counterbalance) the platform assembly 800 and to translate forces/loads applied on the platform assembly 800 to the base assembly 600.

Moving one of the handles 752, 754 may also cause the sleeve 772 of the tube assembly 768 to rotate clockwise. Clockwise rotation of the sleeve 772 in turn, lowers the pulley fork 774 via the lug 775, which, in turn, lowers the first pulley 776 relative to the bridge 782 and the second pulley 778. As the first pulley 776 is lowered, the spring plungers 796 are actuated such that the pins 798 extend into and engage channels 760 in the lower bracket 704 of the interconnecting assembly 700, thereby locking the platform assembly 800 in a selected tilt position relative to the base assembly 600.

The interconnecting assembly 700 may include means for reacting to and resisting crash loads. In this regard, the pins 798 of the selectively retractable locking subassembly 794 and the channels 760 in the lower bracket 704 of the interconnecting assembly 700 are designed to resist crash loads. The pins 798 may be fabricated from a material selected from the group consisting of composites and metalics and have a dimension (e.g., diameter) of at least about 0.25 inches. Preferably, the pins 798 are fabricated from 17.4 PH, H900 and have a diameter of at least about 0.375 inches. The pins 798, and more specifically, the spring plungers 796 from which the pins 798 extend, are commercially available from Reid Tool Supply, Part Numbers SPRSN375-005 and SPRSN500-006__. In order to withstand shear stresses during adverse loading conditions (e.g., crash loads of up to about 16 g's) the pins 798 of the spring plungers 796 are capable of withstanding shear forces of 190,000 psi and preferably, between about 110,000 psi and about 130,000 psi. Similarly, the channels 760 within the lower brackets 704 (e.g., swash plates) are designed to securely receive the pins 798. In this regard, the lower brackets 704 may be fabricated from a material selected from the group consisting of composites and metallic materials. Preferably, the lower brackets 704 are fabricated from 7075-T6. In addition, for purposes of securely engaging the pins 798, the channels 760 are sized to slidably engage and to receive the pins 798.

The platform assembly 800, as illustrated in FIGS. 25, 27, 30, 31, comprises a litter platform 808 slidably interconnected to an upper bracket 708 of the interconnecting assembly 700 and a litter 804 which supports the patient thereon. The slidable connection between the litter platform 808 and an upper bracket 708 allows the litter platform 808 to slide relative to the base assembly 600 interconnected thereto. As such, the litter slide means 810, shown in FIGS. 27, 29, combined with the tilting features of the device 30, may facilitate loading of the patient onto the helicopter as the litter 804 and the patient thereon can engage the litter platform 808 substantially below the floor of the helicopter.

Figure 32:
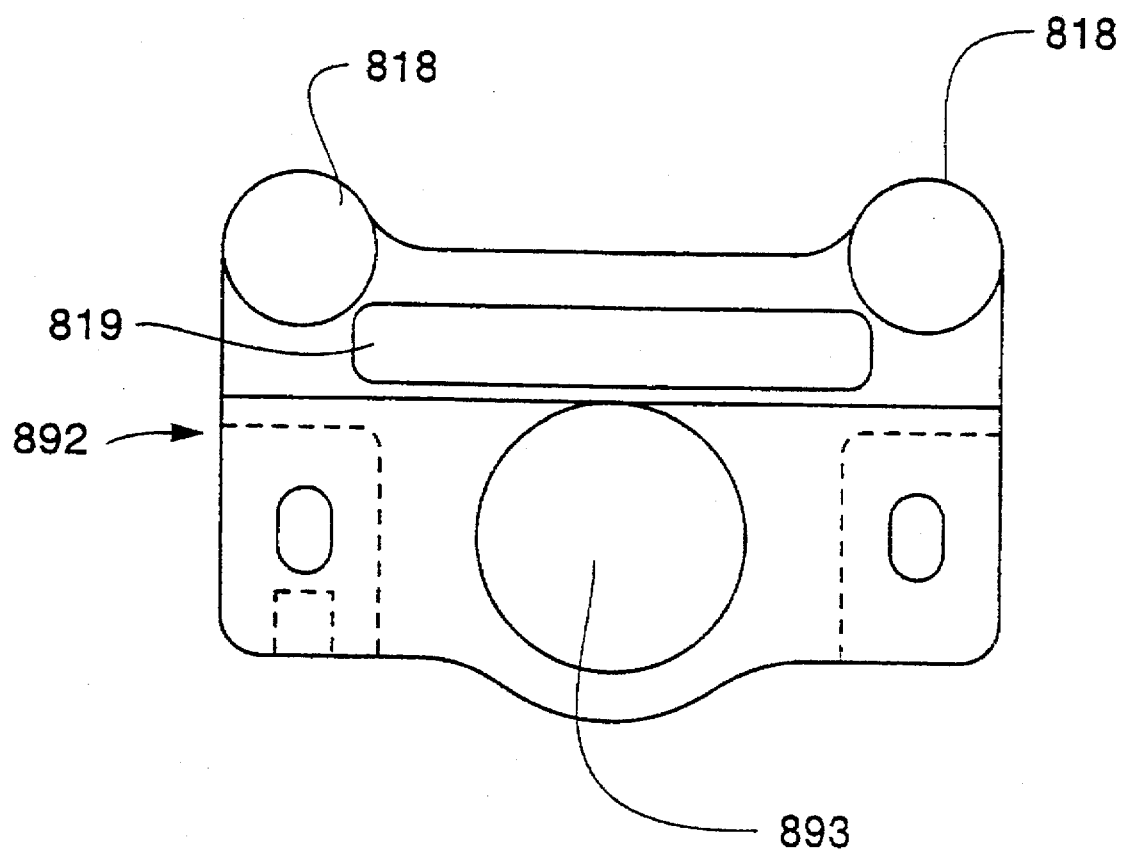
FIG. 32 is a side view of the cam follower bearing.
Figure 34:
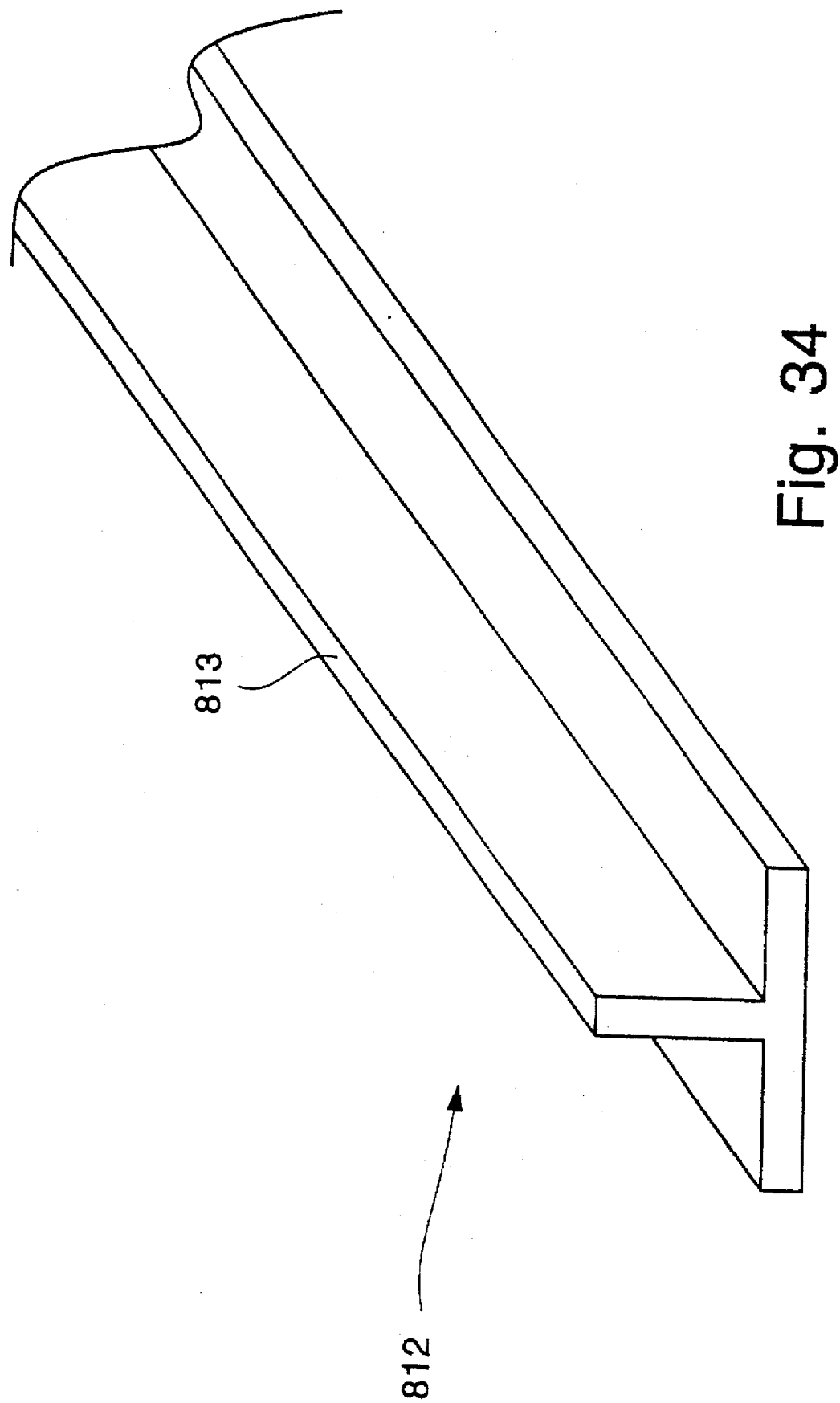
FIG. 34 is a perspective view of a T-shaped track.

In order to accommodate such motion, the platform assembly 800 may be slidably mounted to the interconnecting assembly 700 upon two tracks 812, shown in FIG. 27, via a trolley bracket assembly 892, shown in FIGS. 25, 32. In the illustrated embodiment, shown in FIG. 27, two tracks 812, 814, may be secured to or integrally formed on the underside of the litter platform 808 such that the tracks 812, 814 are parallel to each other. The tracks 812, 814 may be comprised of composite or metalic material. The tracks 812, 814 may have a configuration selected from the group consisting of T-beams, C-beams, V-beams and I-beams. In the illustrated embodiment, the tracks 812, 814 are T-shaped, as shown in FIG. 34. The trolley bracket assembly 892 may be mounted to the upper bracket 708 of the interconnecting assembly 700, proximate the ends of the upper bracket 708 for engaging the tracks 812, 814.

The trolley bracket assembly 842, as shown in FIGS. 25, 29, 32, may comprise captive roller type bearings 818 attachable to the upper bracket 708 and roller bearings 820 positioned on the upper surface 710 of the upper bracket 708 of the interconnecting assembly 700. The captive roller type bearings 818 are sized to slidably capture the tracks 812, 814 and to allow slidable engagement between the litter platform 808 and the upper bracket 708 of the interconnecting assembly 700. The roller bearings 820, illustrated in FIG. 29, are positioned on the upper surface 710 of the upper bracket 708, such that they rollably engage the lower surface 813, illustrated in FIG. 33, of the tracks 812, 814 until the desired transverse position is reached. As such, the lower surface 813 of the tracks 812, 814 rollably engages the roller bearings 820 and the upper surface 710 of the tracks 812, 814 is rollably engageable with the captive roller type bearings 818. In this regard, the captive roller type bearings 818 assist in maintaining rolling engagement between the roller bearings 820 and the tracks 812, 814. In this embodiment, the litter platform 808 may slide between about −36 inches to about +36 inches in either direction relative to a center point on the upper bracket 708 of the interconnecting assembly 700. Additionally, the captive roller type bearings 818 may further comprise a number of bumpers 819 which substantially inhibit lateral translation of the litter platform 808. In this regard, the individual captive roller type bearings 818 can resist shear forces of about 700 eg.

Figure 33:
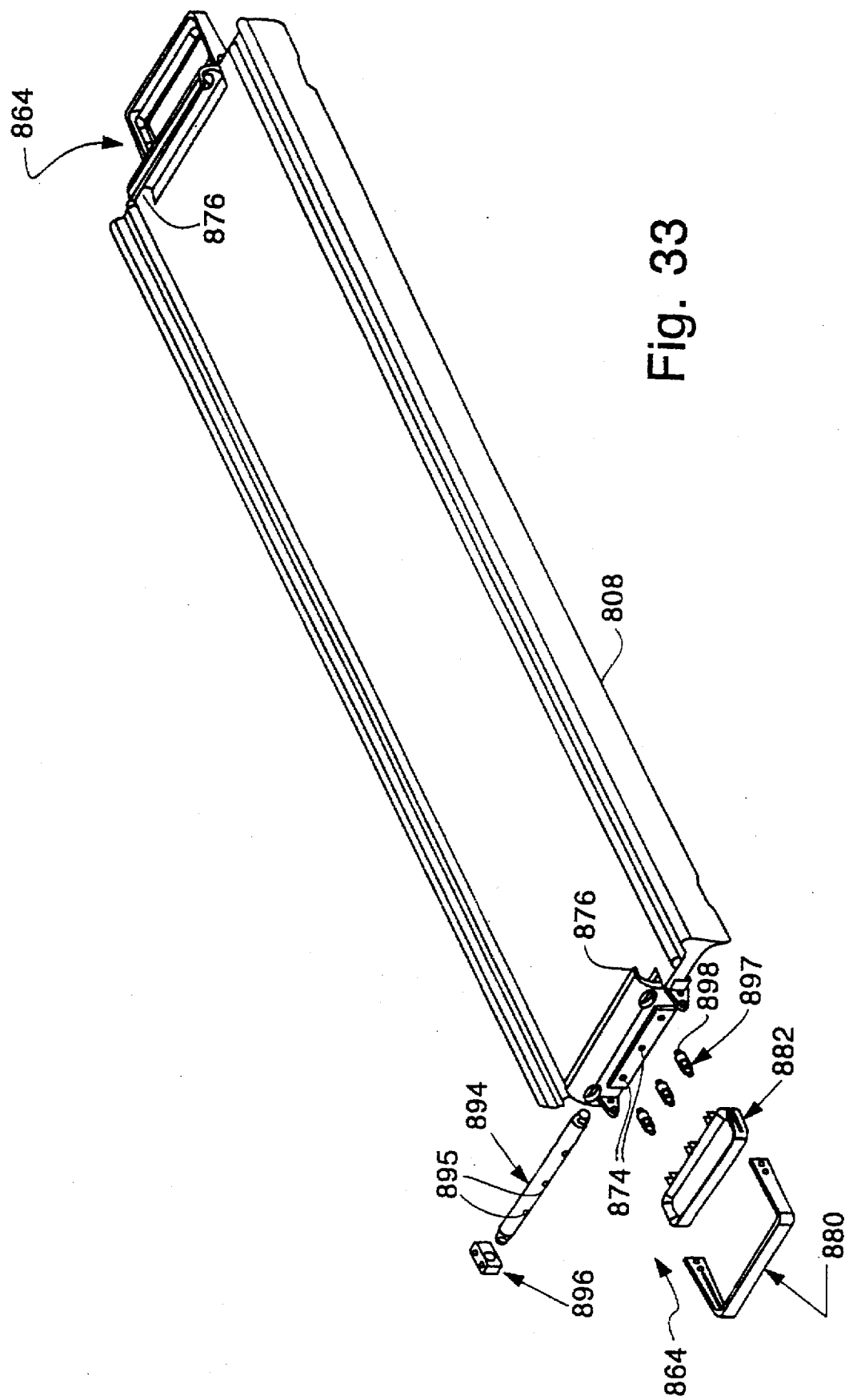
FIG. 33 is a perspective view of the litter engaging means.

For purposes of selectively positioning the slidable litter platform 808 at a specific location relative to the upper bracket 708 and the base assembly 600 interconnected thereto, the platform assembly 800 may include a litter platform locking subassembly 822, shown in FIGS. 27, 29 and 33. Substantially as described hereinabove with respect to previously described embodiments of the device, the litter platform locking subassembly 822 may comprise a bar 826 interconnected to the upper bracket 708, a plurality of retractable spring plungers 830 having pins 832 extendable therefrom, a torque tube 836 for engaging the plungers 830 to thereby extend and retract the pins 832 and handles 846, 848 for actuating the spring plungers 830 via the torque tube 836. The torque tube 836 may be attached to the underside of the litter platform 808 via brackets 842 and positioned proximate the bar 826 such that the pins 832 of the plungers 830 are extendable into any of a number of bores 844 in the bar 826. Alternatively, the bar 826 may be interconnected with the underside of the litter platform 808 and the spring plungers 830 and torque tube 836 may be interconnected to the upper bracket 708.

Since the tilting means and litter platform locking subassembly 822 are independently operable by the operator, the selectively retractable locking subassembly 794 may be actuated for selective tilting purposes as the litter platform 808 is translated linearly relative to the upper bracket 708 of the interconnecting assembly 700. In the described embodiment, the handles 752, 754 of the tilting means and the handles 846, 848, of the litter platform locking subassembly 822 may be operated by a single operator. In this regard, a handle for each of the selective retractable locking subassembly 794 and litter platform locking subassembly 822 may be located proximate each other such that the right hand of the operator may control tilting operations while the operator's left hand controls sliding operations. Alternatively, the handles for the selectively retractable locking subassembly 794 and the litter platform locking subassembly 822 may be controlled by the left and right hands respectively, of the operator.

Figure 31:
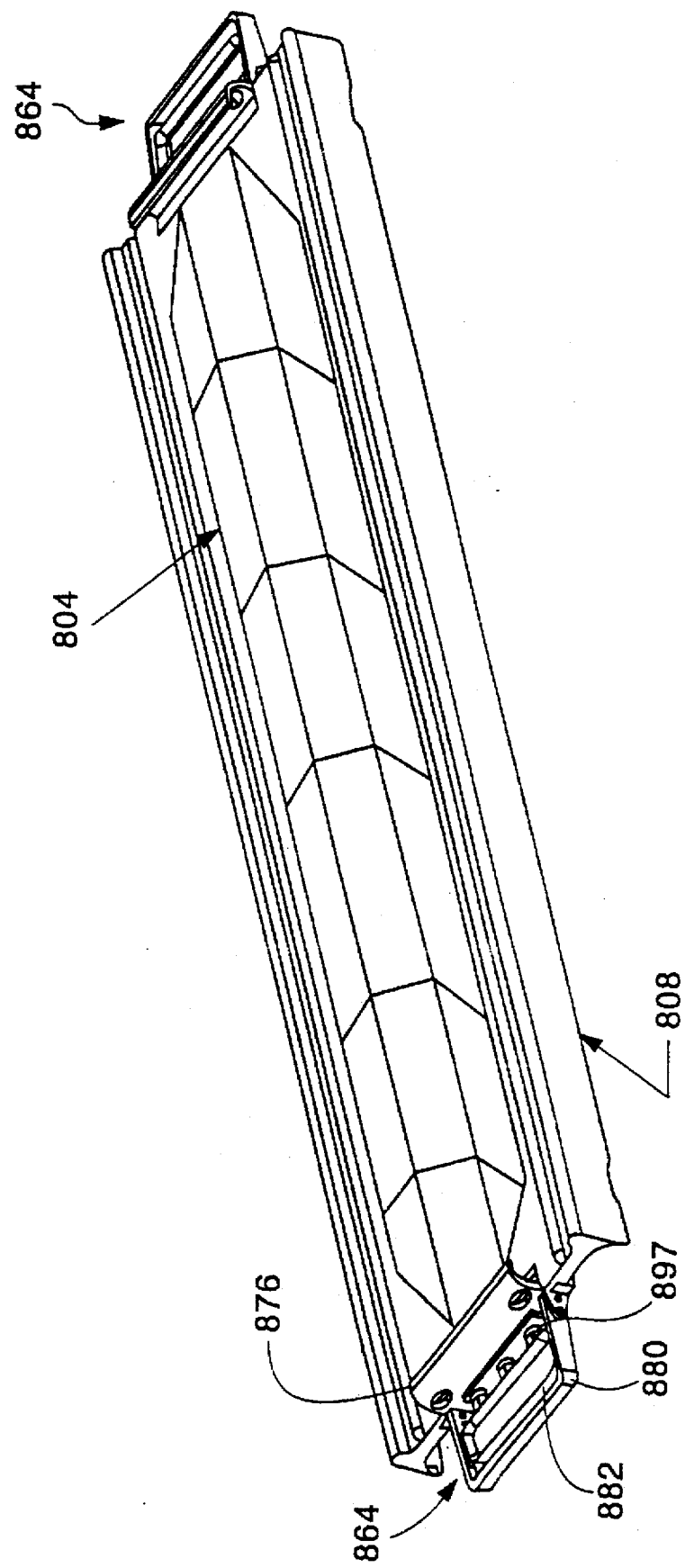
FIG. 31 is a perspective view of the litter platform and litter securing means of the device illustrated in FIG. 21.

For purposes of securing the litter 804 on the litter platform 808, the platform assembly 800 may include a litter engaging means 864, shown in FIGS. 31 and 33. In one embodiment of the invention, a litter engaging means 864 is interconnected to each end of the litter platform 808 to assist in securing a litter 804 therebetween. The litter engaging means 864 may be rotatably mounted about a rod 894 which is fixedly attached to the litter platform 808 via brackets 896. The litter engaging means 864 may comprise, on each end of the litter platform 808, an inner handle 882, which is slidably interconnected with an outer handle 880 and operatively connected to C-shaped member 876 via a number of spring plungers 797. The C-shaped members 876 comprise a number of corresponding channels 874 which are capable of receiving and guiding the pins 898 of the spring plungers 797 into the channels 895 of the rod 894. For purposes of securing the litter 804 on the litter platform 808, the C-shaped members 876 are each engageable with an end portion of the litter 804.

Spring plungers 897 are operatively interconnected to the inner handle 882 such that when the inner handle 882 is pulled toward the outer handle 880, away from the platform assembly 800, the pins 898 of the spring plungers 897 are withdrawn from the channels 874 in the C-member 876 and the channels 895 of the rod 894. Once the pins 898 are withdrawn from the channels 874, 895, the C-member 876 may be rotated downwardly (e.g., counter-clockwise) about the rod 894, which is fixedly attached to the platform assembly 800, to allow the litter 804 to disengage from the litter platform 808. Conversely, in order to secure the litter 804 on the litter platform 808 via the C-shaped member 876, the handles 880, 882 may be rotated in a clockwise direction. Furthermore, the inner handle 882 may be allowed to move away from the outer handle 880, toward the litter platform 808, such that the pins 898 of the spring plungers 897 enter the channels 874, 895 of the C-shaped member 876 and rod 894.

Although this embodiment of the present invention is particularly apt for use in an aircraft, and specifically a helicopter, it should be appreciated that the present invention is also applicable to other vehicles, especially where it is desirable to transport and treat a patient in route to a medical facility.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A patient system and transport device for aircraft comprising:
   a base assembly mountable to the floor of an aircraft;
   a platform assembly for supportably receiving a patient thereupon; and
   interconnecting assembly for portably interconnecting said platform assembly to said base assembly and for selectably tilting said platform assembly relative to said base assembly, wherein said interconnecting assembly includes a means for selectively tilting said platform assembly relative to said base assembly to one of a plurality of tilt positions, said means for selectively tilting comprising a retractable locking subassembly for locking said platform assembly in at least one of said plurality of tilt positions relative to said base assembly.

2. A patient loading system and transport device as claimed in claim 1, wherein said interconnecting assembly further comprises:
   hinge means interposed between said platform assembly and said base assembly.

3. A patient loading system and transport device as claimed in claim 2, wherein said interconnecting assembly further comprises:
   a first upper bracket and a first lower bracket, said hinge means pivotally interconnecting said first upper and first lower brackets, said first lower bracket being secured to said base assembly and said first upper bracket being secured to said platform assembly.

4. A patient loading system and transport device as claimed in claim 2, wherein said hinge means is at an elevated location relative to said base assembly.

5. A patient loading system and transport device as claimed in claim 2, said interconnecting assembly further comprising:
   means, interconnected between said base and platform assemblies, for supporting said platform assembly.

6. A patient loading system and transport device as claimed in claim 5, wherein said supporting means comprises a plurality of telescoping members capable of retractive and extensive movement as said platform assembly tilts about said hinge means and relative to said base assembly.

7. A patient loading system and transport device as claimed in claim 6, wherein said telescoping members are gas springs.

8. A patient loading system and transport device as claimed in claim 1, said platform assembly comprising:
   a litter engaging means, interconnected to said platform assembly, for selectively capturing a litter, wherein the litter is supportable on said platform assembly.

9. A patient loading system and transport device as claimed in claim 8, said litter engaging means comprising:
   at least one handle interconnected with at least one spring plunger for actuating a pin of said spring plunger into and from channels in a c-shaped member for engaging an end portion of the litter and a rod attached to said litter platform.

10. A patient loading system and transport device as claimed in claim 1, wherein said retractable locking subassembly comprises at least one pin selectively engageable with at least one channel in one of upper and lower brackets of said interconnecting assembly.

11. A patient loading system and transport device as claimed in claim 10, wherein said means for selectively tilting further comprises:
    at least one handle operatively connected to a tube assembly, said tube assembly rotatably connected to a pulley system for selectively engaging and disengaging said pin into and from said channel.

12. A patient loading system and transport device as claimed in claim 1, further comprising:

a block, connected to said base assembly and positioned between the floor of the aircraft and said base assembly, for supporting said device.

13. A patient loading system and transport device as claimed in claim 1, wherein said platform assembly comprises:

a litter platform for supportably engaging a litter, the litter capable of supporting a patient thereon, said litter platform being interconnected to an upper bracket of said interconnecting assembly.

14. A patient loading system and transport device as claimed in claim 13, said platform assembly further comprising:

litter platform slide means, positioned between and connecting said litter platform and said interconnecting assembly, for sliding said litter platform relative to said interconnecting assembly.

15. A patient loading system and transport device as claimed in claim 14, wherein said litter platform slide means comprises at least one track interconnected to one of said litter platform and said upper bracket and at least one roller means interconnected to the other of said litter platform and said upper bracket.

16. A patient loading system and transport device as claimed in claim 15, wherein said track comprises a T-shaped beam.

17. A patient loading system and transport device as claimed in claim 15, wherein said roller means comprises at least one captive roller type bearing.

18. A patient loading system and transport device as claimed in claim 14, said platform assembly further comprising:

a means, positioned adjacent said litter platform, for locking said litter platform at one of a plurality of slide positions.

19. A patient loading system and transport device as claimed in claim 18, wherein said litter platform locking means comprises:

a bar and at least one pin selectively extendable into and retractable from at least one channel in said bar, wherein said bar is connected to one of said litter platform and said interconnecting assembly and said pin is interconnected with the other of said litter platform and said interconnecting assembly.

20. A patient loading system and transport device as claimed in claim 19, wherein said litter platform locking means further comprises:

a handle operatively connected to a torque tube, said torque tube rotatably connected to said pin, for selectively engaging and disengaging said pin with and from said channel.

21. A patient system and transport device for aircraft comprising:

a base assembly mountable to the floor of an aircraft;

a platform assembly for supportably receiving a patient thereupon; and an interconnecting assembly for supportably interconnecting said platform assembly to said base assembly and for selectively tilting said platform assembly relative to said base assembly, wherein said platform assembly comprises a litter engaging means, interconnected to said platform assembly, for selectively capturing a litter, wherein the litter is supportable on said platform assembly, said litter engaging means comprising at least one handle interconnected with at least one spring plunger for actuating a pin of said spring plunger into and from channels in a c-shaped member for engaging an end portion of the litter and a rod attached to said litter platform.

* * * * *